(12) United States Patent
Frolander

(10) Patent No.: US 10,875,560 B2
(45) Date of Patent: Dec. 29, 2020

(54) PLUMBER'S SUPPORT HAVING IMPROVED HEIGHT ADJUSTMENT CAPABILITIES AND PROVIDING ENHANCED UPPER BODY SUPPORT

(71) Applicant: John Frolander, San Marcos, CA (US)

(72) Inventor: John Frolander, San Marcos, CA (US)

( * ) Notice: Subject to any disclaimer, the term of this patent is extended or adjusted under 35 U.S.C. 154(b) by 573 days.

(21) Appl. No.: 15/472,030

(22) Filed: Mar. 28, 2017

(65) Prior Publication Data

US 2017/0280881 A1 Oct. 5, 2017

Related U.S. Application Data

(60) Provisional application No. 62/315,840, filed on Mar. 31, 2016.

(51) Int. Cl.
*B25H 5/00* (2006.01)
*B62B 3/02* (2006.01)

(52) U.S. Cl.
CPC ............... *B62B 3/02* (2013.01); *B25H 5/00* (2013.01)

(58) Field of Classification Search
CPC .... B25H 5/00; B62B 3/02; B62B 5/08; B62B 5/0093; B62B 1/12; A47C 9/027; A47C 16/005
See application file for complete search history.

(56) References Cited

U.S. PATENT DOCUMENTS

| | | |
|---|---|---|
| 68,811 A | 9/1867 | Van Doren |
| 1,368,716 A | 2/1921 | Gontrum et al. |
| 2,611,417 A * | 9/1952 | Henry ...................... B25H 5/00 |
| | | 280/30 |
| 2,729,905 A | 1/1956 | Crozier |
| 2,843,391 A | 7/1958 | Pelletier |
| 2,872,252 A | 2/1959 | Konkle |
| 3,407,899 A | 10/1968 | Delafrange |
| 3,677,569 A | 7/1972 | Larson |
| 3,949,436 A * | 4/1976 | Fawess .................. A47C 9/027 |
| | | 5/657 |
| 4,580,799 A | 4/1986 | Quinonez |

(Continued)

FOREIGN PATENT DOCUMENTS

JP        3119184        6/1998

*Primary Examiner* — Steve Clemmons
(74) *Attorney, Agent, or Firm* — Doherty IP Law Group LLC

(57) ABSTRACT

A height adjustable plumber's support includes an elongated board having top and bottom major surfaces that extend from a proximal end to a distal end of the elongated board, a cushioned pad covering a central region of the top major surface, a head pad covering the top major surface adjacent the distal end of the elongated board, a foot pad covering the top major surface adjacent the proximal end of the elongated board, and a pair of flexible handles secured to opposite lateral sides of the elongated board. The height adjustable plumber's support includes a foldable support leg secured to the proximal end of the elongated board. The foldable support leg has a vertical section and a horizontally extending section. The foldable support leg is height adjustable for adjusting the height of the proximal end of the elongated board over a floor surface, such as when the distal end of the elongated board is inserted into a cabinet having an elevated base.

18 Claims, 23 Drawing Sheets

(56) References Cited

U.S. PATENT DOCUMENTS

| | | | |
|---|---|---|---|
| 4,639,003 A * | 1/1987 | Potter | B62B 5/02 188/5 |
| 4,735,392 A * | 4/1988 | Farmer | B25H 5/00 108/133 |
| 4,741,512 A | 5/1988 | Elkuch | |
| 4,895,380 A | 1/1990 | Brooks | |
| 4,925,245 A | 5/1990 | Pendleton et al. | |
| 4,986,558 A | 1/1991 | Morris | |
| 5,002,293 A | 3/1991 | Gottselig | |
| 5,022,670 A | 6/1991 | Cote | |
| 5,078,280 A | 1/1992 | Nordeen | |
| 5,195,763 A * | 3/1993 | Scott | B25H 5/00 280/32.6 |
| 5,451,068 A | 9/1995 | Shockley | |
| 5,535,975 A * | 7/1996 | Scott | B25H 5/00 248/118.1 |
| 5,895,062 A | 4/1999 | Miles et al. | |
| 6,044,775 A * | 4/2000 | Lashlee | A47B 3/0818 108/132 |
| 6,398,234 B1 | 6/2002 | Brown | |
| 6,871,861 B2 | 3/2005 | Hernandez, Jr. | |
| D503,867 S | 4/2005 | Bennette et al. | |
| 7,070,189 B2 | 7/2006 | Grauss | |
| D536,799 S * | 2/2007 | Freitas | D25/66 |
| 7,178,868 B2 | 2/2007 | Richardson | |
| 7,293,783 B2 | 11/2007 | Whiteside et al. | |
| 7,305,728 B2 | 12/2007 | Schlieps | |
| 7,958,574 B1 | 6/2011 | Bodeen et al. | |
| 8,056,908 B2 | 11/2011 | Scott | |
| 8,209,803 B2 * | 7/2012 | Bandel | A61G 1/04 5/625 |
| 8,505,138 B1 | 8/2013 | Minichiello et al. | |
| 8,596,651 B2 | 12/2013 | Canova | |
| 8,833,518 B2 * | 9/2014 | Holcombe | A01M 31/02 16/348 |
| 9,242,369 B1 | 1/2016 | Richmond, Jr. | |
| 9,486,914 B1 | 11/2016 | Frolander | |
| D832,459 S * | 10/2018 | Whiteside | D25/62 |
| 2001/0024022 A1 * | 9/2001 | Antirose | B25H 5/00 280/32.6 |
| 2006/0200909 A1 | 9/2006 | Beck | |
| 2007/0090619 A1 * | 4/2007 | Lundh | B62B 9/12 280/63 |
| 2007/0176378 A1 | 8/2007 | Bangs | |
| 2008/0035424 A1 * | 2/2008 | Klockler | E06C 7/426 182/116 |
| 2008/0093810 A1 * | 4/2008 | Liu | B25H 5/00 280/32.6 |
| 2008/0309035 A1 | 12/2008 | Whiteside et al. | |
| 2010/0066069 A1 | 3/2010 | Bradshaw | |
| 2011/0049822 A1 * | 3/2011 | Hinman | B25H 5/00 280/32.6 |
| 2016/0102468 A1 * | 4/2016 | Bastien | B25H 5/00 182/222 |

\* cited by examiner

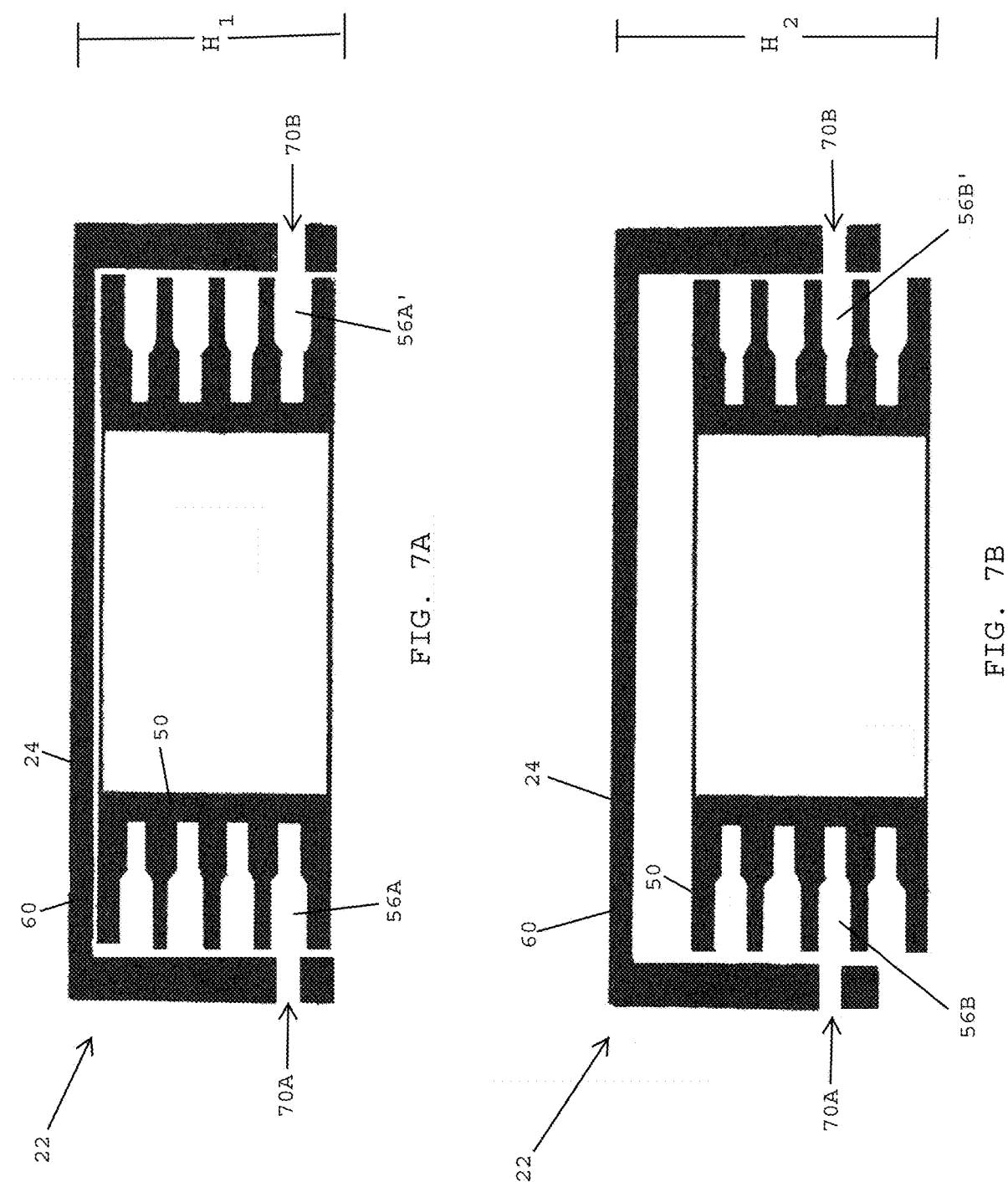

PLUMBER'S SUPPORT HAVING IMPROVED HEIGHT ADJUSTMENT CAPABILITIES AND PROVIDING ENHANCED UPPER BODY SUPPORT

CROSS-REFERENCE TO RELATED APPLICATIONS

The present patent application claims benefit of U.S. Provisional Application Ser. No. 62/315,840, filed Mar. 31, 2016, and is related to U.S. patent application Ser. No. 14/737,282, filed Jun. 11, 2015, now U.S. Pat. No. 9,486, 914, issued Nov. 8, 2016, the disclosures of which are hereby incorporated by reference herein.

BACKGROUND OF THE INVENTION

Field of the Invention

The present invention is generally related to the plumbing industry, and is more specifically related to plumber's supports used under sinks and inside cabinets.

Description of the Related Art

A creeper is a movable platform on which an individual lies on his or her back in order to maneuver into or underneath low and confined spaces. Plumber's creepers are designed to facilitate working underneath kitchen sinks and inside cabinets having a surface that is raised relative to a floor surface. The plumber's field has developed various devices to address the particular nuances of a worker lying on his or her back, while attempting to navigate inside the cabinet, and while supporting his or her upper body weight over two different heights for the floor surface and the cabinet floor. For conventional cabinets, the height difference between the floor surface and the cabinet floor is typically about 3.5 to 5.5 inches.

There have been numerous attempts directed to providing plumber's creepers. For example, U.S. Pat. No. 3,677,569 to Larson discloses a foldable creeper having a lower body support with four wheels mounted thereon and an extender for supporting the upper body having a single wheel mounted on the underside thereof. The extender is connected to the lower body support via a hinge so that the extender can be folded over the lower body support. The wheels on the lower body support are designed to be positioned on a floor surface and the single wheel on the extender is designed to be positioned on a cabinet floor having a greater height than the floor surface. Larson does not enable an operator to adjust the height of the creeper to accommodate cabinet floors having different heights.

U.S. Patent Application Publication No, 2011/0049822 to Hinman discloses a plumber's creeper for supporting a person in a generally horizontal position. The creeper has a bottom side having wheels mounted thereon and a top side having a foam pad or cushion. The wheels are attached to the underside of the support platform and allow the device to be moved and maneuvered by the user. The wheels are affixed and positioned such that the head end of the creeper is cantilever supported beyond the forward most wheels to enable a person to enter the opening of a sink type cabinet door and navigate above the raised toe kickboard and cabinet floor while the creeper wheels remain on the floor outside of the cabinet. The wheels have locking pins that enable a worker to adjust the height of the platform to accommodate varying cabinet toe kickboard heights. The platform head end supports the person's head and upper torso while working within the confined cabinet space. The platform head end has an inwardly tapered section including two substantially semi-circle cutouts so that the device can be moved into cabinets having a smaller entry port than the full width of the device.

In spite of the above advances, there are many drawbacks associated with prior art creepers. First, in the Larson design, the single wheel on the extender does not provide sufficient lateral support for a worker's upper body as the worker rolls from side to side, which will result in the creeper tipping inside the cabinet. Second, in the Larson design, the single wheel mounted on the underside of the extender results in all of the worker's weight being concentrated onto the single wheel, which may result in the wheel denting or marring the surface of the cabinet floor. Third, the Larson device does not provide for height adjustment so that it cannot be modified to work well inside cabinets having different cabinet floor heights.

These deficiencies are not overcome by the Hinman reference, which discloses a creeper that provides no support for the upper body, which will result in the upper section of the creeper tipping inside the cabinet, and which will cause stress and strain on the user due to there being no lateral support inside the cabinet. Moreover, the Hinman device has a very complex procedure for adjusting the height of the creeper whereby locking pins must be removed from each wheel and then re-installed. In Hinman, the locking pins may be misplaced or lost, which renders the device useless for its intended use.

Thus, there remains a need for improved plumber's creepers that may be used inside cabinets having different cabinet floor heights, that may be easily adjusted to different heights, that provide enhanced support for an upper body as a user rolls from side to side inside a cabinet, that facilitate rolling movement of the upper body portion of the creeper inside a cabinet, that minimize the chances of exposure to chemicals and liquids present inside the cabinet, and that will not damage or mar the surface of the cabinet floor as the creeper rolls over a cabinet floor.

SUMMARY OF THE INVENTION

In one embodiment, a height adjustable plumber's support preferably includes an elongated board having a major top surface and a major bottom surface. The plywood board extends from a first end to a second end of the plumber's support. The top major surface of the plywood board is covered by a cushioned pad that is secured thereto. The height adjustable plumber's support also includes a head pad secured adjacent the distal end of the board and a foot pad secured adjacent the proximal end of the board. The head and foot pads may be removable and held in place by hook and loop fastening material.

In one embodiment, the height adjustable plumber's support includes a pair of flexible handles that are secured to opposite lateral sides of the board. The handles may be made of rugged materials such as fabric, cloth and vinyl. In one embodiment, a first flexible handle is secured to a first lateral side of the board and a second flexible handle is secured to a second lateral side of the board.

In one embodiment, the height adjustable plumber's support includes a foldable support leg having a vertical section and a horizontally extending section. As will be described in more detail herein, the foldable support leg is height adjustable for adjusting the height of the proximal end of the board over a floor surface. When not in use, the foldable support leg may be folded over the bottom major surface of the board for storage and transport purposes.

In one embodiment, the height adjustable plumber's support may be utilized in conjunction with a cabinet having a cabinet floor that is elevated relative to the floor surface. As the proximal end of the board is held above the floor surface by the foldable support leg, the distal end of the board is positioned atop the elevated cabinet floor. The height of the vertical section of the leg may be adjusted so that the top major surface of the board is parallel relative to the floor surface. When the distal end of the board is inserted into a cabinet having a cabinet floor of a different height than the cabinet, the height of the vertical section of the leg may be adjusted to accommodate the different height of the cabinet floor.

In one embodiment, the foldable leg includes the vertical section having a series of vertically aligned openings. A vertical height adjustment includes depressible snap buttons that may be depressed for adjusting the length of the vertical section of the leg relative to the plywood board. The height adjustable plumber's support also includes a foldable bracket that secures the foldable support leg to the underside of the plywood board. The foldable support leg is movable between a vertical, extended position and a folded, horizontal configuration in which the vertical section of the leg extends parallel to the bottom major surface of the plywood board.

During transport and storage, the foldable leg is typically placed in the folded configuration. During use, the foldable leg is extended into the vertical orientation.

In one embodiment, spaced rubber pads are secured to the bottom major surface of the plywood board. In one embodiment, the spaced rubber pads are secured over the upper body support section adjacent the distal end of the plywood board. In one embodiment, a first pair of rubber pads are secured adjacent the distal end of the plywood board. In one embodiment, a second pair of rubber pads are secured between the first set of rubber pads and the mid-section of the plywood board. In one embodiment, a third set of rubber pads are secured to a mid-section of the plywood board. The rubber pads are desirably secured over a bottom major surface of the plywood board, and are spaced away from one another to distribute weight evenly. The rubber pads are designed to prevent the underside of the plumber's support from scratching the inside of a cabinet when the board is placed over a cabinet floor. The rubber pads also provide lateral support as a user rolls from side to side atop the board when working inside a cabinet.

In one embodiment, T-nuts are utilized for securing the rubber pads over the bottom major surface of the plywood board. In one embodiment, the upper ends of the T-nuts are disposed over the top major surface of the board and the vertical components of the T-nuts extend through the thickness of the board. The rubber pads are secured over the bottom major surface of the board by aligning the rubber pads with the threaded ends of the T-nuts and utilizing threaded fasteners for securing the rubber pads to the plywood board.

In one embodiment, the plumber's support includes the padded cushion that overlies the top major surface of the plywood board. Threaded fasteners are used for securing the padded cushion to the plywood board.

In one embodiment, the folding bracket of the foldable leg is secured over the bottom major surface of the plywood board. The folding bracket enables the folding leg to move from the extended, vertical orientation to the folding, collapsed configuration. The folding bracket may include a lock for maintaining the foldable leg in the extended position and preventing the foldable leg from collapsing to the collapsed configuration.

In one embodiment, a height adjustable plumber's support includes a plywood board having a proximal end and a distal end, and a cushioning pad that overlies the top major surface of the board. The plumber's support includes a removable foot pad that covers the proximal end of the board and a removable head pad that covers the distal end of the board. In one embodiment, the head pad and foot pad are secured to the top major surface of the plywood board using releasable fastening materials such as hook and loop fastening material sold under the trademark Velcro. In one embodiment, the head pad may be removed from its attachment with the distal end of the board and reattached to the proximal end of the board. Similarly, the foot pad may be moved from the proximal end of the board to an attachment with the distal end of the board.

In one embodiment, the flexible handles are secured to the long sides of the board for carrying the plumber's support, when necessary.

In one embodiment, the distal end of the board is inserted into the cabinet so that the rubber pads contact the top surface of the cabinet floor. The height of the vertical leg support of the foldable leg is adjusted so that the top major surface of the board extends along an axis $A_1$ that is parallel with the floor surface, and so that the rubber pads are in support with the top surface of the cabinet floor. The proximal end of the board and the foldable leg are located outside the cabinet. The horizontal component of the foldable leg sits atop of the floor surface.

In one embodiment, a second cabinet has a cabinet floor defining a greater height than the cabinet floor height of a first cabinet, whereby the cabinet floor height of the second cabinet is greater than the cabinet floor height of the first cabinet. The distal end of the board is inserted into the cabinet so that the rubber pads secured to the bottom major surface of the board contact the top surface of the cabinet floor. The height of the vertical support of the foldable leg is adjusted so that the top major surface of the body extends along an axis $A_2$ that is parallel with the floor surface. In one embodiment, the depressible button is depressed for adjusting the height of the vertical section of the leg so that the board is parallel to the floor surface.

In one embodiment, the proximal end of the board and the foldable leg lie outside of the cabinet. The vertical section and the horizontal section of the foldable leg is supported by the floor surface SF.

In one embodiment, the plumber's support includes a head pad secured over the distal end of the board and a foot pad secured over the proximal end of the board. In one embodiment, the head pad has a greater thickness than the foot pad.

In one embodiment, the plumber's creeper disclosed herein uses the structural strength of the cabinet to support the upper body of user, which avoids the shifting of bodyweight and center of gravity issues encountered with prior art creepers that utilize a cantilever approach.

In one embodiment, the upper body support uses elongated rollers that extend across the width of the upper body section to avoid and/or minimize the likelihood of marring or scratching the cabinet. This is an improvement over creepers having a single wheel that supports the upper body inside the cabinet. It is also an improvement over creepers using a cantilever design which has the potential to tip and have a throw bar scratch the inside of a cabinet.

In one embodiment, the upper body support is not dramatically tapered inwardly toward the head, thereby allowing a user to roll from shoulder to shoulder on either side, which enables a user to reach significantly further into the cabinet while retaining firm, padded support.

Tapered creepers provide less support to the upper body, which may cause the user to strain when reaching for a remote section of the cabinet. Tapered creepers also increase the chances that a user may come in contact with the cabinet floor, which may have chemical residue from chemicals stored under a sink, or which may have water/moisture from leaking pipes, valves, etc.

Prior art creeper devices provide tool drawers that must be pulled open to access tools stored therein. This design makes it difficult for an operator to open a drawer and access the tools while lying on his or her back. It may also be difficult to pen drawers due to the drawers being blocked by the doors of a cabinet. In contrast, in one embodiment, the present invention discloses a plumber's creeper having tool wings located on each side of the lower body support. The tool wings are essentially storage bins that are open at the top to provide for easy access to the hand tools stored therein.

The plumber's creeper disclosed herein provides for one step height adjustment by engaging height adjustment levers. Prior art devices require a multi-step process whereby locking pins are removed and repositioned for four different wheels. The prior art systems may result in loss of the locking pins.

The present invention provides a plumber's creeper that may be used under sinks and inside cabinets to perform work. The plumber's creeper disclosed herein provides enhanced, stable support, enhanced comfort, and maximized the range of movement inside the cabinet while still providing upper body support. The plumber's creeper disclosed herein also minimizes the likelihood of damaging the cabinet floor because the upper body support uses elongated rollers that spread the user's weight across the width of the upper body support instead of at one wheel location.

When working under a sink, there is a tremendous amount of shifting of position going on in order to reach around drains, garbage disposals, water lines, and electrical supply lines. The leverage required to tighten connections constantly shifts a user's weight from the lower body to the upper body. Cantilevered creepers have inherent instability and tip when a user shift's his or her body weight. When a cantilevered creeper tips, it may scratch or mar the cabinet floor, which is undesirable.

In one embodiment, the plumber's creeper disclosed herein has a wider upper body support with elongated rollers extending across the width of the upper body support for providing maximum support and comfort. The elongated rollers support a user as the user rolls from shoulder to shoulder of side to side to reach remote locations inside the cabinet. Providing enhanced lateral support reduces the amount of time and energy required to accomplish a required task, and projects may be completed with less stress and strain on the body.

Using elongated rollers that extend across the width of the upper body support prevents sharp or pointed edge contact between the upper body support and the floor of a cabinet.

The one step level adjustment feature disclosed herein saves a tremendous amount of time and provides a major convenience. Any time elements must be detached from a main body (e.g., removing locking pins from vertical wheel shafts to adjust height) there is an increased chance that items will be lost.

In one embodiment, a plumber's creeper preferably includes a lower body support having an inner frame with wheels mounted to an underside thereof and an outer frame telescopically received over the inner frame, whereby the outer frame is adapted for sliding telescopic movement relative to the inner frame for adjusting the height of the lower body support The plumber's creeper desirably includes a height adjustment element coupled with the outer frame, the height adjustable element having a locked position in which the height adjustable element is in contact with both the outer and inner frames for preventing sliding telescopic movement of the outer and inner frames relative to one another for preventing height adjustment of the lower body support, and an unlocked position in which the height adjustable element is in contact with the outer frame and not in contact with the inner frame for enabling sliding telescopic movement of the outer frame relative to the inner frame for adjusting the height of the lower body support. The plumber's creeper preferably includes an upper body support connected with the lower body support via a hinge that enables the upper body support to be folded over the lower body support. The plumber's creeper has a folded configuration in which a top surface of the upper body support opposes a top surface of the lower body support and an unfolded configuration in which the top surface of the upper body support and the top surface of the lower body support lie in a common plane.

In one embodiment, the upper body support preferably has elongated rollers mounted over a bottom surface thereof. The elongated rollers desirably extend across the width of the upper body support for spreading the weight of a user's body across the width of the upper body support.

In one embodiment, when the plumber's creeper is in an unfolded configuration, the wheels mounted on the inner frame of the lower body support and the elongated rollers mounted on the upper body support are at different heights. In one embodiment, the wheels on the inner frame will be positioned on a floor surface and the rollers on the upper body support will be positioned in a cabinet floor that is at a different height than the floor surface.

In one embodiment, the inner frame has first and second lateral side walls having a series of vertically aligned height adjustment holes formed therein. The vertically aligned height adjustment holes desirably extend from a lower end of the inner frame toward an upper end of the inner frame. The centers of the height adjustment holes may be spaced about 0.5 inches away from an adjacent hole.

In one embodiment, when the plumber's creeper is in the locked position, the height adjustment element is extended into the height adjustment holes of the inner frame. When the plumber's creeper is in the unlocked position, the height adjustment element is retracted from and not in contact with the height adjustment holes of the inner frame for enabling the outer frame to slide relative to the inner frame.

In one embodiment, the height adjustment element desirably includes a first height adjustment lever located on a first lateral side of the outer frame and a second height adjustment lever located on a second lateral side of the outer frame. The first and second height adjustment levers may have spring loaded pins that are normally extended into the height adjustment holes. The height adjustment levers may be pulled away from the sides of the outer frame for retracting the pins from the height adjustment holes for adjusting the height of the lower body support. When a desired height has been attained, the levers may be released for locking the position of the outer frame relative to the inner frame.

In one embodiment, each of the spring loaded pins desirably includes a spring that normally urges the spring loaded pin into the extended position. When the spring loaded pin is retracted into the unlocked position, energy is stored in the spring.

In one embodiment, the wheels mounted on the inner frame are caster wheels so that the lower body support is unidirectional. In one embodiment, the elongated rollers mounted on the upper body support preferably include a series of rollers spaced from one another between a distal end of the upper body support and a proximal end of the upper body support. The elongated rollers in any one of the series of rollers desirably extend the majority of the way across the width of the upper body support.

In one embodiment, the plumber's creeper may include a latch provided on the lower body support for securing the upper body support in the folded configuration. In one embodiment, the latch is provided on the lower body support and a latch flange is provided on the upper body support. The latch may engage the latch flange for holding the creeper in the folded configuration.

In one embodiment, the lower body support preferably has a box-like shape, and the outer frame also has a box-like shape with an inner dimension that closely matches an outer dimension of the inner frame. In one embodiment, the inner surface of the outer frame preferably slides over an outer surface of the inner frame during telescopic movement of the outer frame over the inner frame.

In one embodiment, a plumber's creeper preferably includes a lower body support including an inner frame having caster wheels mounted to an underside thereof for enabling the lower body support to roll over a floor surface. The lower body support desirably has an outer frame telescopically received over the inner frame, whereby the outer frame has a top surface, and whereby the outer frame is adapted for sliding telescopic movement relative to the inner frame for adjusting the height of the top surface of the outer frame relative to the floor surface. The plumber's creeper may include a height adjustment element coupled with the outer frame. The height adjustable element preferably has a locked position in which the height adjustable element is in contact with both the outer and inner frames for preventing sliding telescopic movement of the outer and inner frames relative to one another, and an unlocked position in which the height adjustable element is in contact with the outer frame and not in contact with the inner frame for allowing sliding telescopic movement of the outer frame relative to the inner frame for adjusting the height of top surface of the outer frame relative to the floor surface. The plumber's creeper desirably has an upper body support connected with the outer frame of the lower body support via a hinge that enables the upper body support to be folded over the outer frame. The plumber's creeper desirably has a folded configuration in which a top surface of the upper body support opposes the top surface of the outer frame and an unfolded configuration in which the top surface of the upper body support and the top surface of the outer frame lie in a common plane. As a result, the wheels of the lower body support may be positioned on the floor surface and the rollers of the upper body support may be positioned over a cabinet floor having a different height than the floor surface.

These and other preferred embodiments of the present invention will be described in more detail below.

BRIEF DESCRIPTION OF THE DRAWING

FIGS. 7A-7D show a cross-sectional view of the lower body support of FIGS. 1 and 2 with the outer frame at different heights relative to the inner frame.

DETAILED DESCRIPTION

Figure 1:
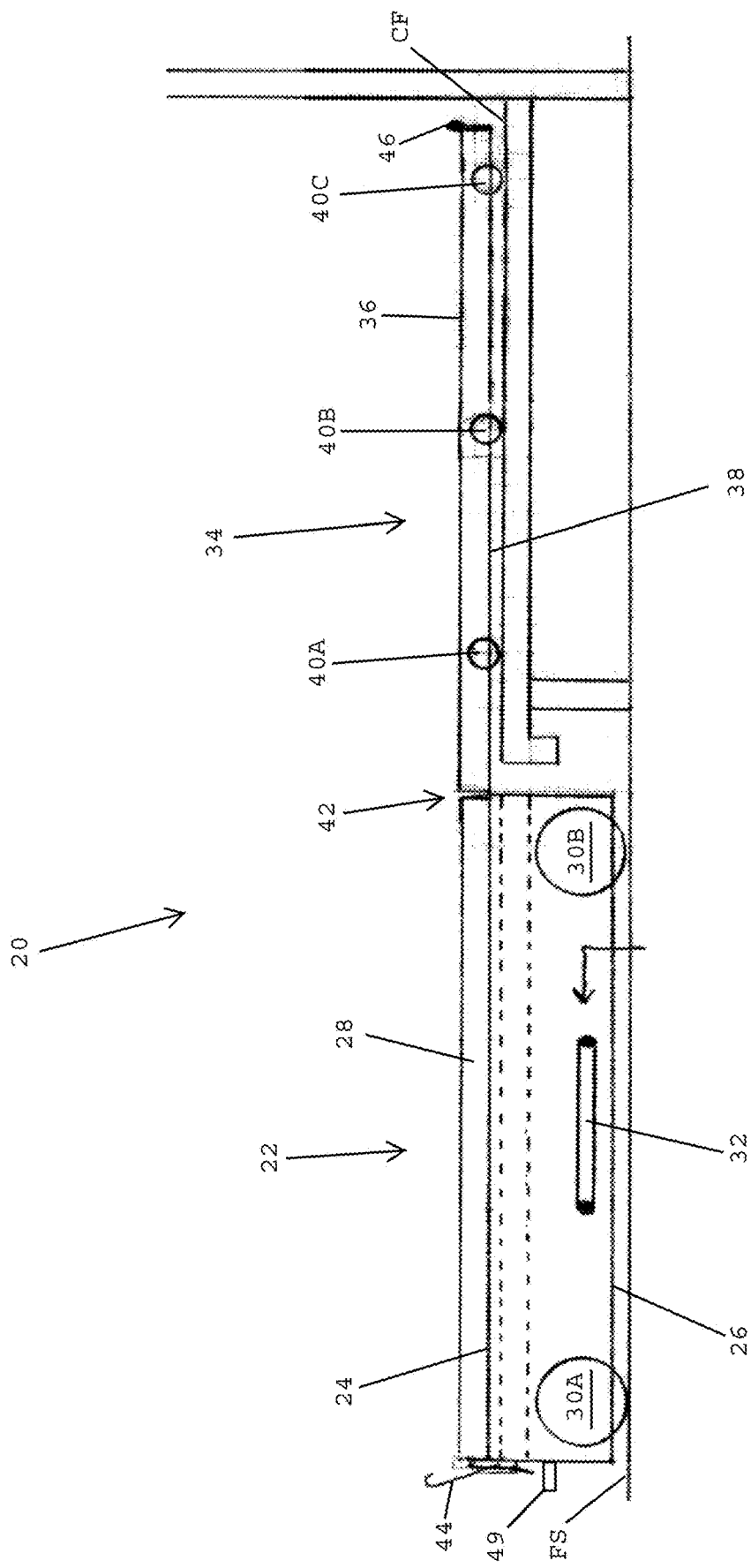
FIG. 1 shows a side elevation view of a plumber's creeper including a lower body support and an upper body support, in accordance with one embodiment of the present invention.

Referring to FIG. 1, in one embodiment, a height-adjustable plumber's creeper 20 preferably includes a lower body support 22 having a top surface 24 and a bottom surface 26. A first pad 28 desirably overlies the top surface 24 of the lower body support 22 to provide cushioning support for an individual positioned atop the plumber's creeper. The lower body support 22 preferably includes wheels 30, such as caster wheels, that project below the bottom surface 26 of the lower body support so that the lower body support may roll over a surface, such as a floor surface FS. In FIG. 1, only two wheels 30A, 30B are shown, however, in certain preferred embodiments, the lower body support may have four wheels that enable the lower body support to easily roll over surfaces. The wheels may be evenly spaced from one another around the perimeter of the lower body support, such as in the four corners of the lower body support. In one embodiment, the wheels may include a wide variety of swiveling, pivoting, gliding, sliding, rolling, revolving, rotating or otherwise suitable casters, wheels or rollers configured to provide maximum maneuverability.

The plumber's creeper desirably includes at least one height adjustment lever 32 that enables an operator to adjust the height of the top surface 24 of the lower body support 22 relative to the floor surface FS. In one embodiment, the plumber's creeper has a height adjustment lever 32 provided on both sides of the lower body support. As will be described in more detail herein, the height adjustment levers are spring loaded and may be retracted for enabling the height of the lower body support to be adjusted and set at a desired height.

Figure 2:
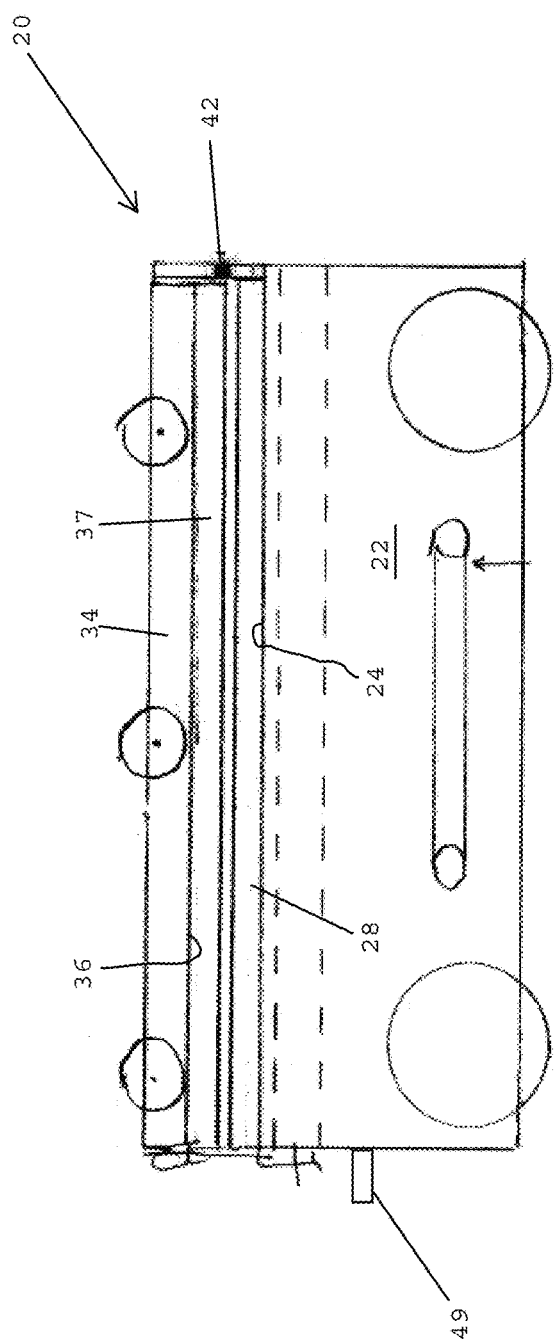
FIG. 2 shows the plumber's creeper of FIG. 1 with the upper body support folded over the lower body support.

In one embodiment, plumber's creeper 20 desirably includes an upper body support 34 having a top surface 36 and a bottom surface 38. The top surface 36 of the upper body support 34 may be covered by a cushioning pad 37 (FIG. 2). The upper body support 34 preferably includes elongated rollers 40A, 40B, 40C that are mounted to the underside of the upper body support and that project below the bottom surface 38 of the upper body support 34 for enabling the upper body support to roll over a surface, such as a cabinet floor CF. The upper body support 34 and the lower body support 22 are preferably connected together via a hinge 42 that enables the upper body support to be folded over the lower body. In one embodiment, it may be desirably to place the plumber's creeper in the folded configuration for storing and/or transporting the creeper. The lower body support 22 desirably has a latch 44 and the upper body support desirably has a latch flange 46 that is engaged by the latch 44 for holding the upper body support 34 in the folded configuration (FIG. 2).

Referring to FIG. 2, in one embodiment, the upper body support 34 is folded over the lower body support 22 so that the pad 37 over the top surface 36 of the upper body support opposes the pad 28 over the top surface 24 of the lower body support 22. The latch 44 on the lower body support 22 engages the latch flange 46 on the upper body support 34 for holding the creeper 20 in the folded configuration. The hinge 42 enables the creeper to transform from the unfolded configuration shown in FIG. 1 to the folded configuration shown in FIG. 2. The creeper may be repeatedly transformed from the folded configuration to the unfolded configuration and back again.

Referring to FIGS. 1 and 2, in one embodiment, the plumber's creeper 20 desirably includes a carrying handle 49 that enables the creeper to be picked up and carried from one location to another location. In one embodiment, the carrying handle 49 is accessible at the outer surface of the lower body support 22. The carrying handle 49 may be moveable between a folded, storage configuration, and an extended, carrying configuration. The carrying handle 49 may include a pivot or hinge that enables the carrying handle to move from the folded configuration to the extended configuration.

Figure 3A:
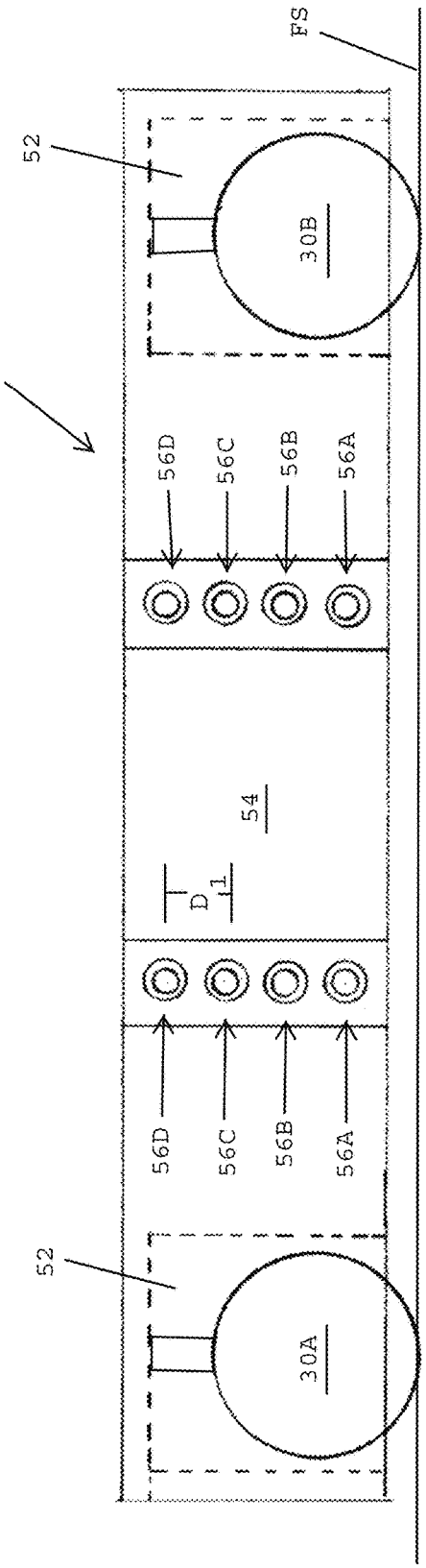
FIG. 3A shows a side elevation view of an inner frame of the lower body support of the plumber's creeper shown in FIGS. 1 and 2.

Referring to FIG. 3A, in one embodiment, the lower body support 22 (FIG. 1) preferably includes an inner frame 50 having wheels 30A, 30B mounted within wheel recesses 52. The inner frame 50 desirably has a first side wall 54 with a series of height adjustment holes 56A-56D that enable the lower body support to be adjusted to different heights. In one embodiment, the height adjustment holes 56 for each level include a pair of height adjustment holes. In one embodiment, there are two spaced holes 56A at a first height level, two spaced holes 56B at a second height level, etc.

In one embodiment, the series of height adjustment holes 56A-56D are vertically aligned with one another and have centers that are spaced about ½ inch from one another. In one embodiment, the centers of the respective holes 56A-56D are spaced a distance D1 of about 0.5 inches from one another. The above dimensions may be modified and still fall within the scope of the present invention.

Figure 3B:
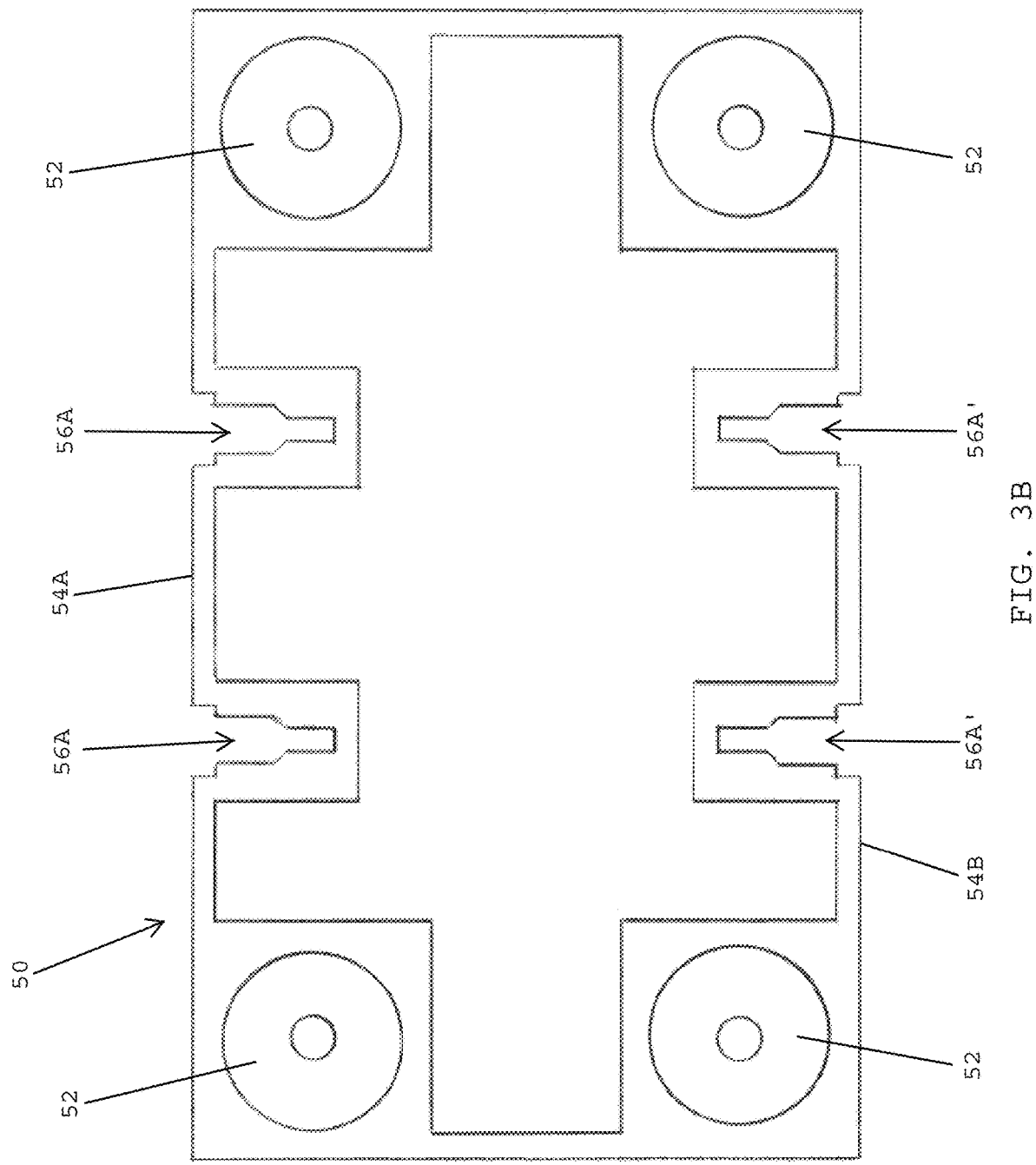
FIG. 3B shows a top plan view of the inner frame of the lower body support shown in FIG. 3A.

Referring to FIG. 3B, in one embodiment, the inner frame 50 of the lower body support 22 (FIG. 1) preferably includes the first side wall 54A, a second side wall 54B, a first end wall 55A and a second end wall 55B. The pair of spaced height adjustment holes 56A in the first side wall 54A are desirably aligned with the pair of spaced height adjustment holes 56A' in the second side wall 54B. The wheel recesses 52 are preferably positioned adjacent the four corners of the lower frame 50. The wheels 30 (FIG. 3A) may be caster-like wheels that are mounted within the wheel recesses 52 so that the lower body support may roll in any direction over a floor surface.

Figure 4:
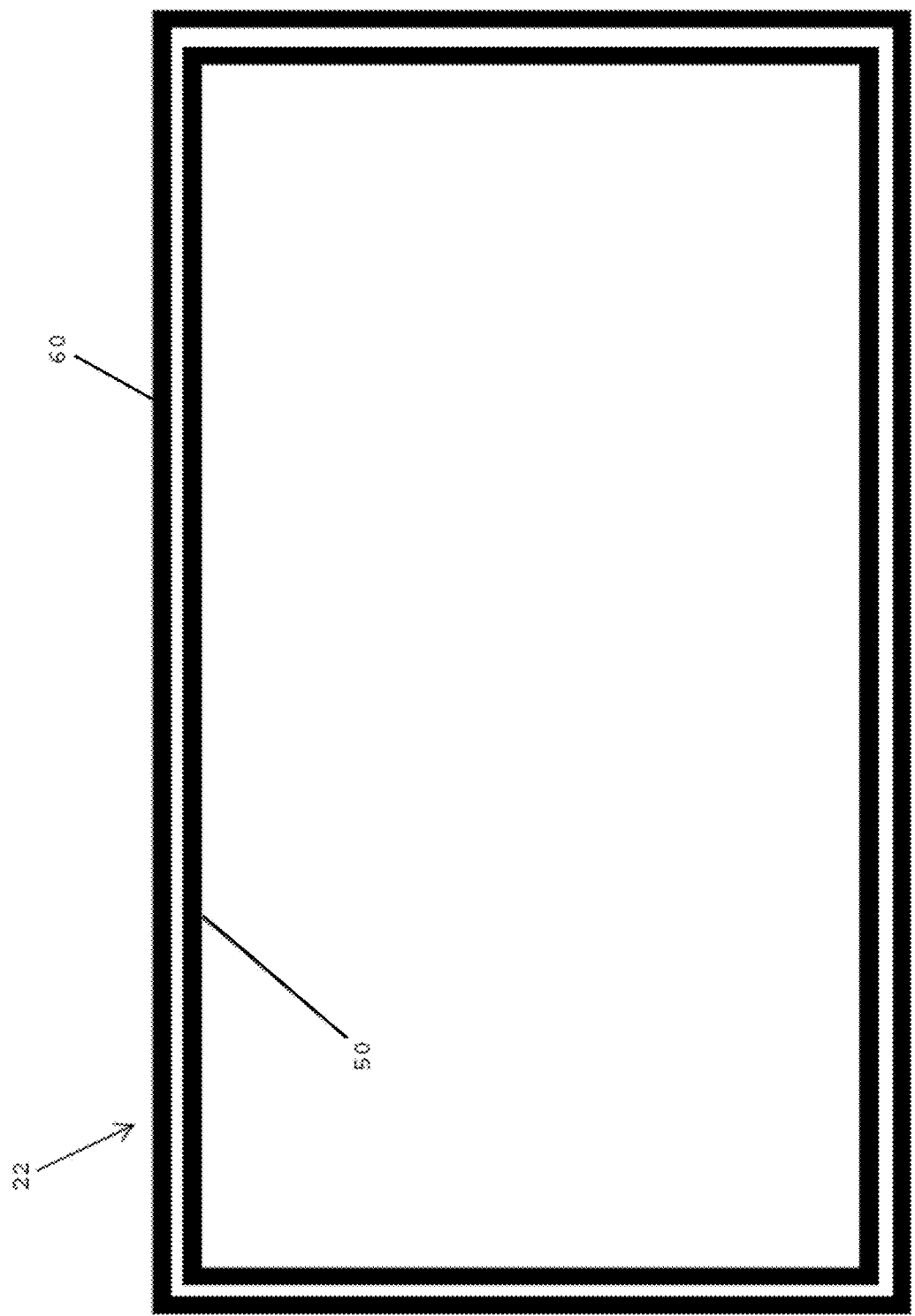
FIG. 4 shows a schematic view of the lower body support of the plumber's creeper of FIGS. 1 and 2, the lower body support having an inner frame and an outer frame telescopically received over the inner frame.

Referring to FIG. 4, in one embodiment, the lower body support 22 preferably includes the inner frame 50 and an outer frame 60 that is telescopically received over the inner frame and that slides over the inner frame for adjusting the height of the lower body support. The sliding, telescopic movement of the outer frame over the inner frame enables the position of the outer frame 60 to be adjusted relative to the inner frame 50. In one embodiment, an outer dimension of the inner frame 50 closely matches the inner dimension of the outer frame 60 so that the inner surface of the outer frame slides over the over surface of the inner frame when adjusting the height of the lower body support. When a desired height has been attained, the height adjustment levers 32 (FIG. 1) may be inserted into the height adjustment holes formed in the inner frame to desirably hold the outer frame 60 at a selected height relative to the inner frame 50.

Figure 5:
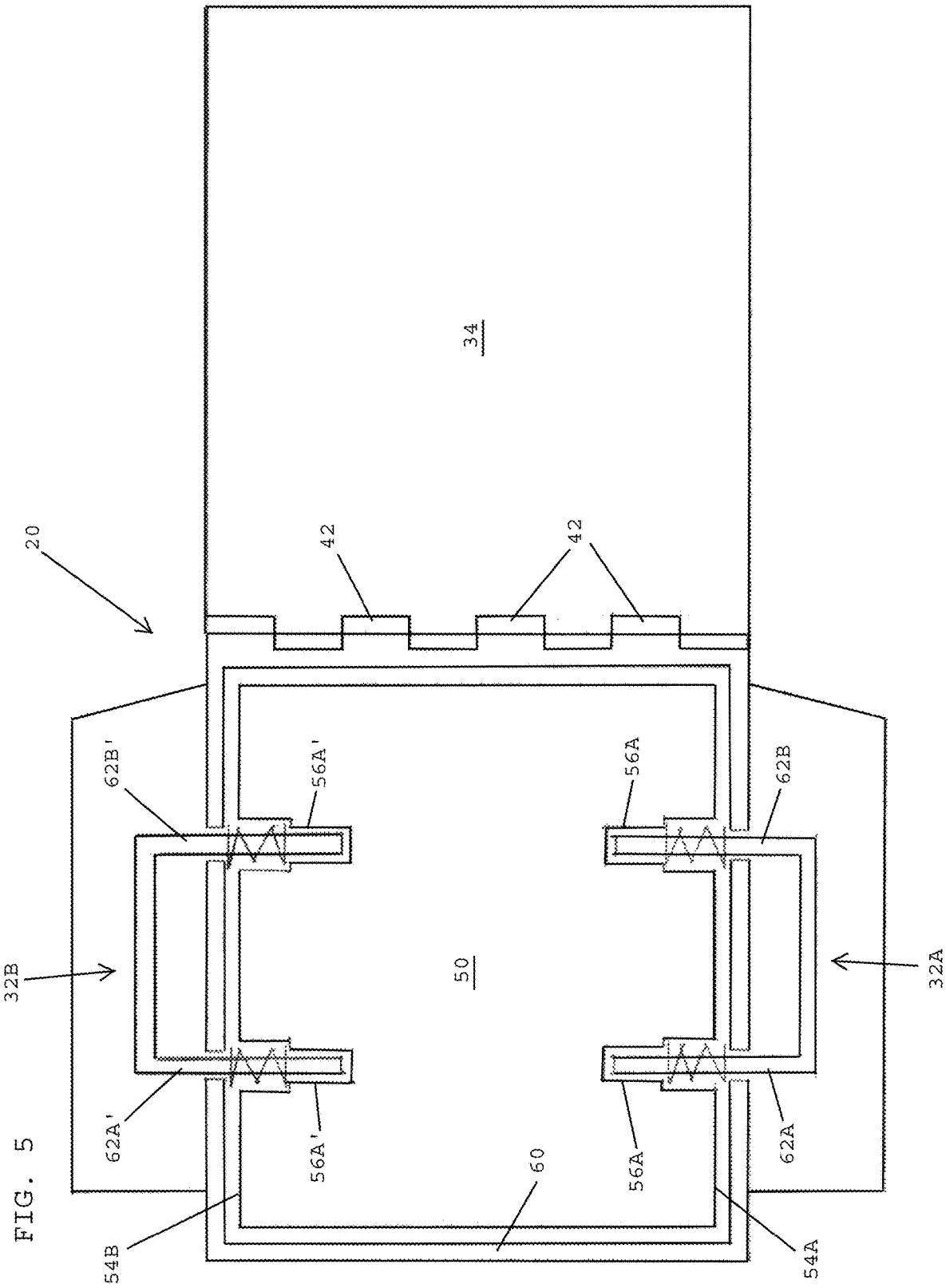
FIG. 5 shows a top plan view of a plumber's creeper including a lower body support having an inner frame and an outer frame, an upper body support hingedly connected with the lower body support, and a pair of height adjustment elements accessible at the sides of the lower body support, in accordance with one embodiment of the present invention.

Referring to FIG. 5, in one embodiment, a first height adjustment lever 32A projects from a first side wall of the lower body support 22, and a second height adjustment lever 32B projects from a second side wall of the lower body support. The first height adjustment lever 32A preferably has a pair of spring loaded pins 62A, 62B that are adapted to pass through the height adjustment holes 56A provided in the first side wall 54A of the inner frame 50. The second height adjustment lever 32B desirably has a pair of spring loaded pins 62A', 62B' that are adapted to pass through the height adjustment holes 56A' provided in the second side wall 54B of the inner frame 50. In operation, the height adjustment levers 32A, 32B are preferably retracted (i.e., pulled away from one another) for enabling the outer frame 60 to slide up or down relative to the inner frame for adjusting the height of the lower body support. When a desired height has been attained, the height adjustment levers may be released for locking the position of the outer frame 60 relative to the inner frame 50.

As shown in FIG. 5, in one embodiment, the upper body support 34 is connected to the lower body support 22 via a hinge connection 42, which enables the upper body support to be folded over the lower body support 22.

Figure 6:
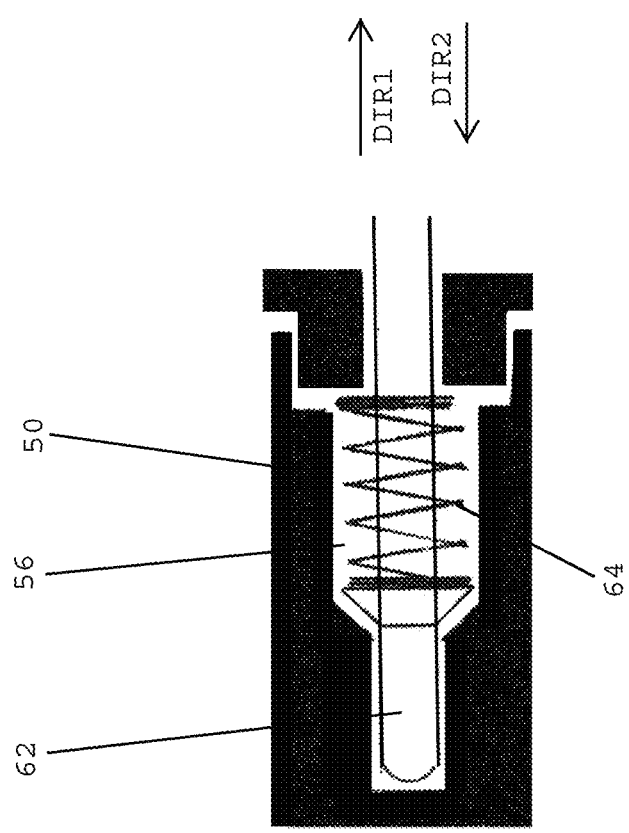
FIG. 6 shows a spring loaded pin of one of the height adjustment elements shown in FIG. 5, in accordance with one embodiment of the present invention.

Referring to FIGS. 5 and 6, in one embodiment, each height adjustment lever 32A, 32B preferably includes at least one spring loaded pin 62 that is adapted for insertion into one of the height adjustment holes 56 provided in the inner frame 50 for holding the position of the outer frame 60 relative to the inner frame 50. In one embodiment, each spring loaded pin 62 desirably includes a spring 64 that is compressed when the pin 62 is pulled in a first direction DIR1 for retracting the pin 62 from the hole 56 so that a height adjustment may be made. When a desired height adjustment has been achieved, the height adjustment lever 32 (FIG. 5) may be released so that the compressed spring 64 may urge the pin 62 to move in the direction DIR2 for extending the distal end of the pin into the hole 56 for holding the height of the outer frame 60 relative to the inner frame 50.

Figure 7C:
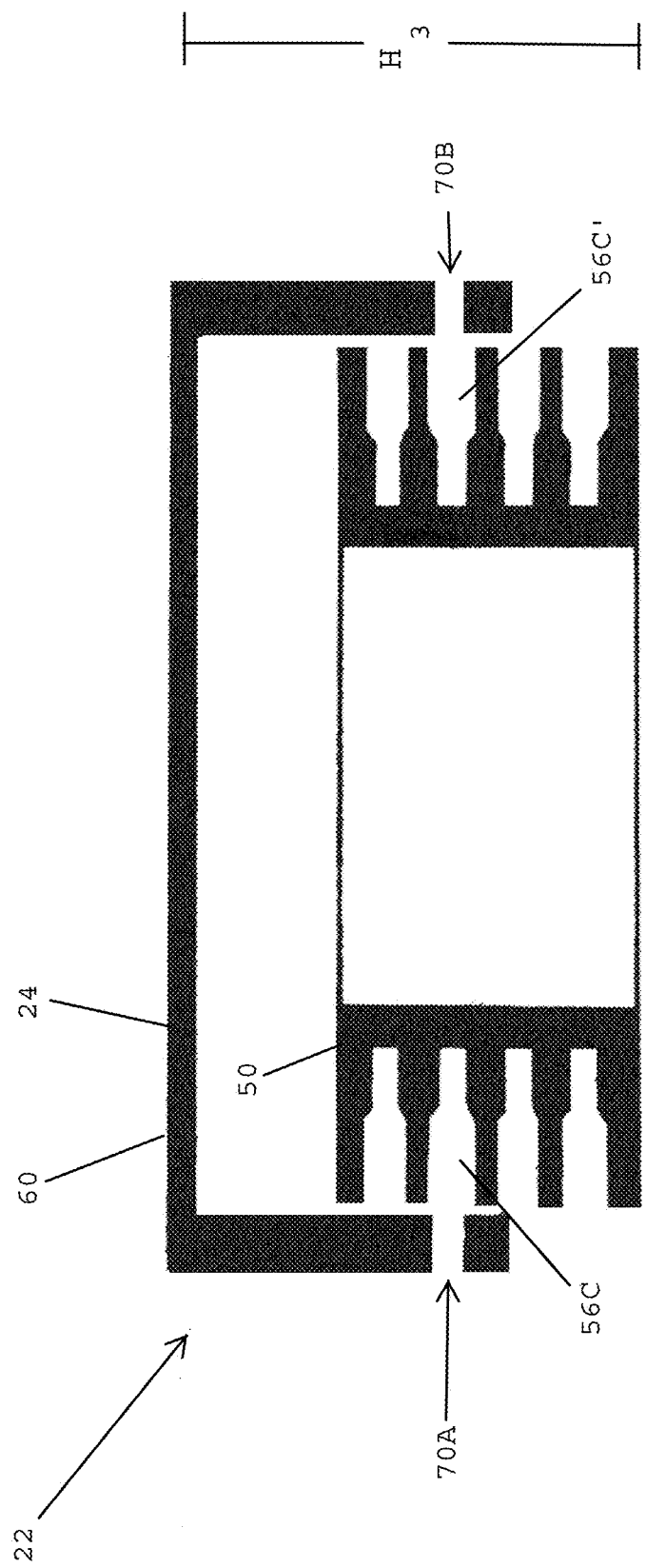

FIGS. 7A-7D show the top surface 24 of the lower body support 22 at various heights relative to the floor surface FS. In FIGS. 7A-7D the wheels 30 (FIG. 1) have been removed for improving clarity. In FIG. 7A, height adjustment holes 70A, 70B in the outer frame 60 are aligned with the first height adjustment holes 56A, 56A' formed in the inner frame 50 so that the top surface 24 of the lower body support 22 is at a first height $H_1$ above a floor surface FS. The pins 62 (FIG. 6) of the height adjustment lever may be inserted through the aligned holes 70A, 56A and 70B, 56A' for holding the position of the outer frame 60 relative to the inner frame 50.

In FIG. 7B, height adjustment holes 70A, 70B in the outer frame 60 are aligned with the second height adjustment holes 56B, 56B' formed in the inner frame 50 so that the top surface 24 of the lower body support 22 is at a second height $H_2$ above a floor surface FS. The second height H2 is greater than the first height $H_1$ (FIG. 7A). The pins 62 (FIG. 6) of the height adjustment lever may be inserted through the aligned holes 70A, 56B and 70B, 56B' for holding the position of the outer frame 60 relative to the inner frame 50.

In FIG. 7C, height adjustment holes 70A, 70B in the outer frame 60 are aligned with the third height adjustment holes 56C, 56C' formed in the inner frame 50 so that the top surface 24 of the lower body support 22 is at a third height $H_3$ above a floor surface FS. The third height H3 is greater than the second height $H_2$ (FIG. 7B). The pins 62 (FIG. 6) of the height adjustment lever may be inserted through the aligned holes 70A, 56C and 70B, 56C' for holding the position of the outer frame 60 relative to the inner frame 50.

Figure 7D:
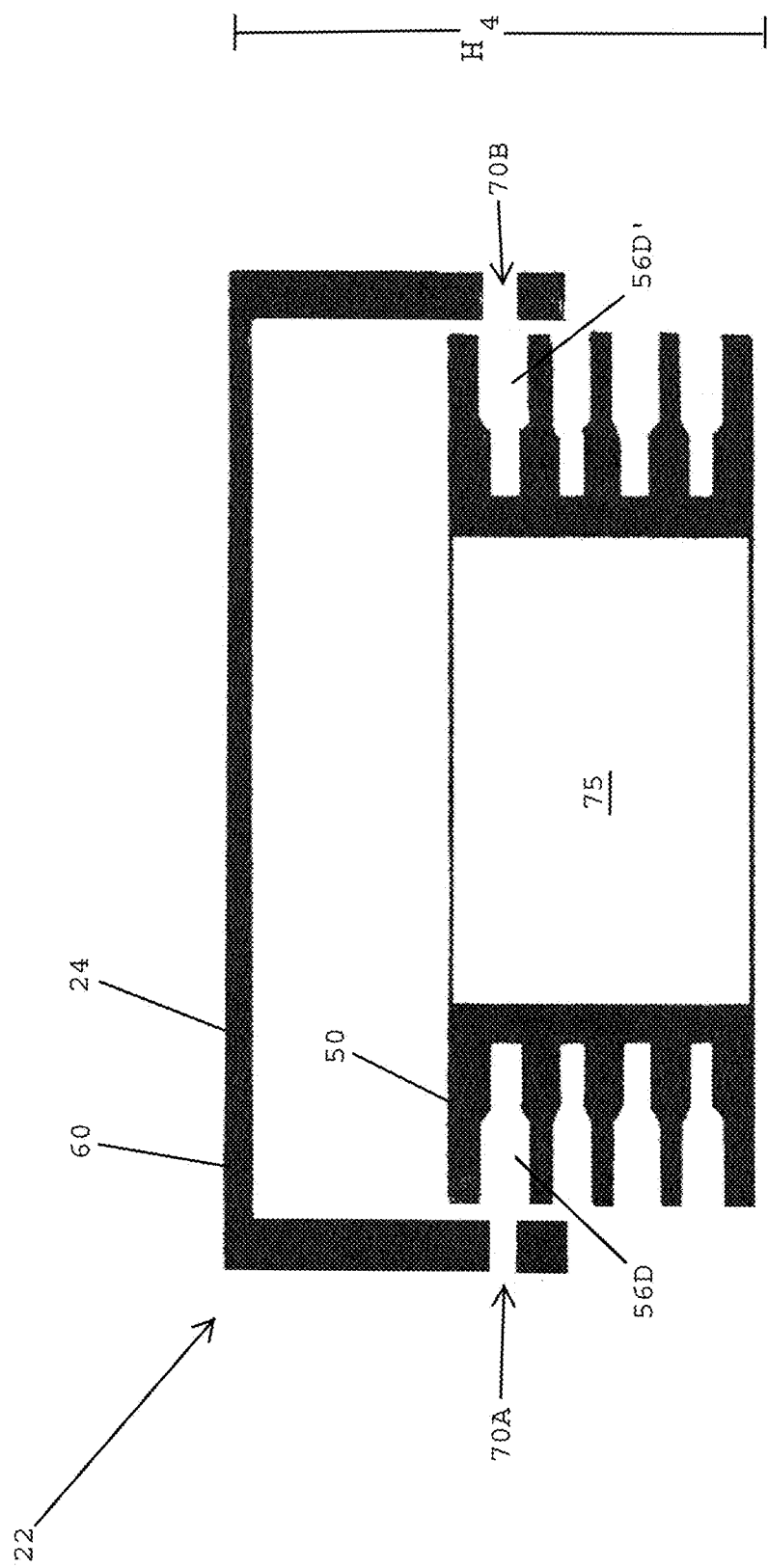

In FIG. 7D, height adjustment holes 70A, 70B in the outer frame 60 are aligned with the fourth height adjustment holes 56D, 56D' formed in the inner frame 50 so that the top surface 24 of the lower body support 22 is at a fourth height $H_4$ above a floor surface FS. The fourth height $H_4$ is greater than the third height $H_3$ (FIG. 7C). The pins 62 (FIG. 6) of the height adjustment lever may be inserted through the aligned holes 70A, 56D and 70B, 56D' for holding the position of the outer frame 60 relative to the inner frame 50.

Referring to FIG. 7D, in one embodiment, the lower body support 22 may include a storage compartment 75 provided therein for storing tools. In one embodiment, the storage compartment 75 is located inside the inner frame 50 of the lower body support 22. The tool wings described herein may also be stored within the storage compartment 75.

Figure 8:
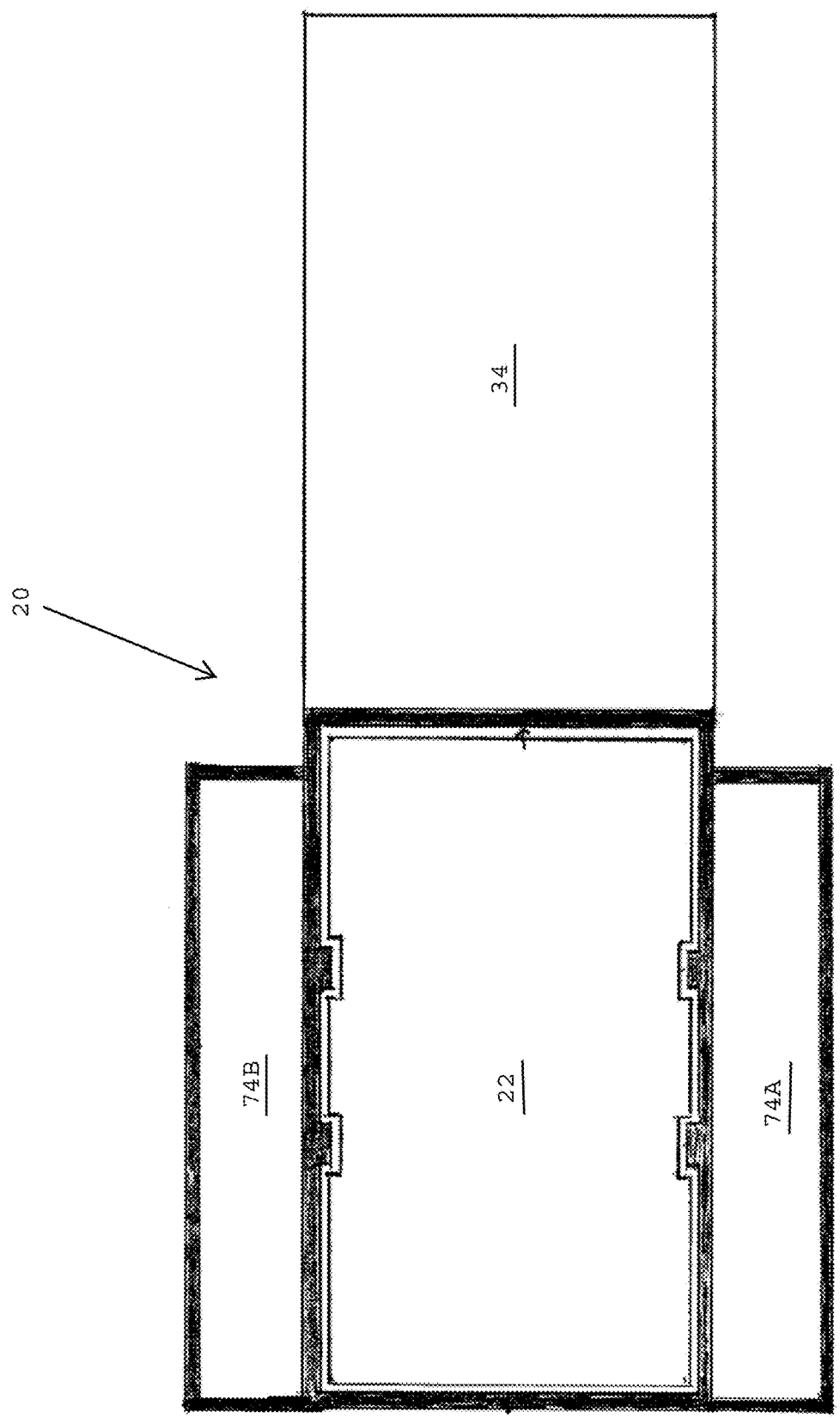
FIG. 8 shows a top plan view of a plumber's creeper including a lower body support, an upper body support hingedly connected with the lower body support, and a pair of tool wings secured to opposite sides of the lower body support, in accordance with one embodiment of the present invention.

Referring to FIG. 8, in one embodiment, a plumber's creeper 20 may include first and second tool wings 74A, 74B that are desirably secured to the sides of the lower body support 22. The tool wings 74A, 74B preferably provide a location for storing tools that may be used by an operator. The location of the tool wings 74A, 74B allow an operator to access tools when lying on his or her back atop the lower body support 22 and the upper body support 34.

Figure 9:
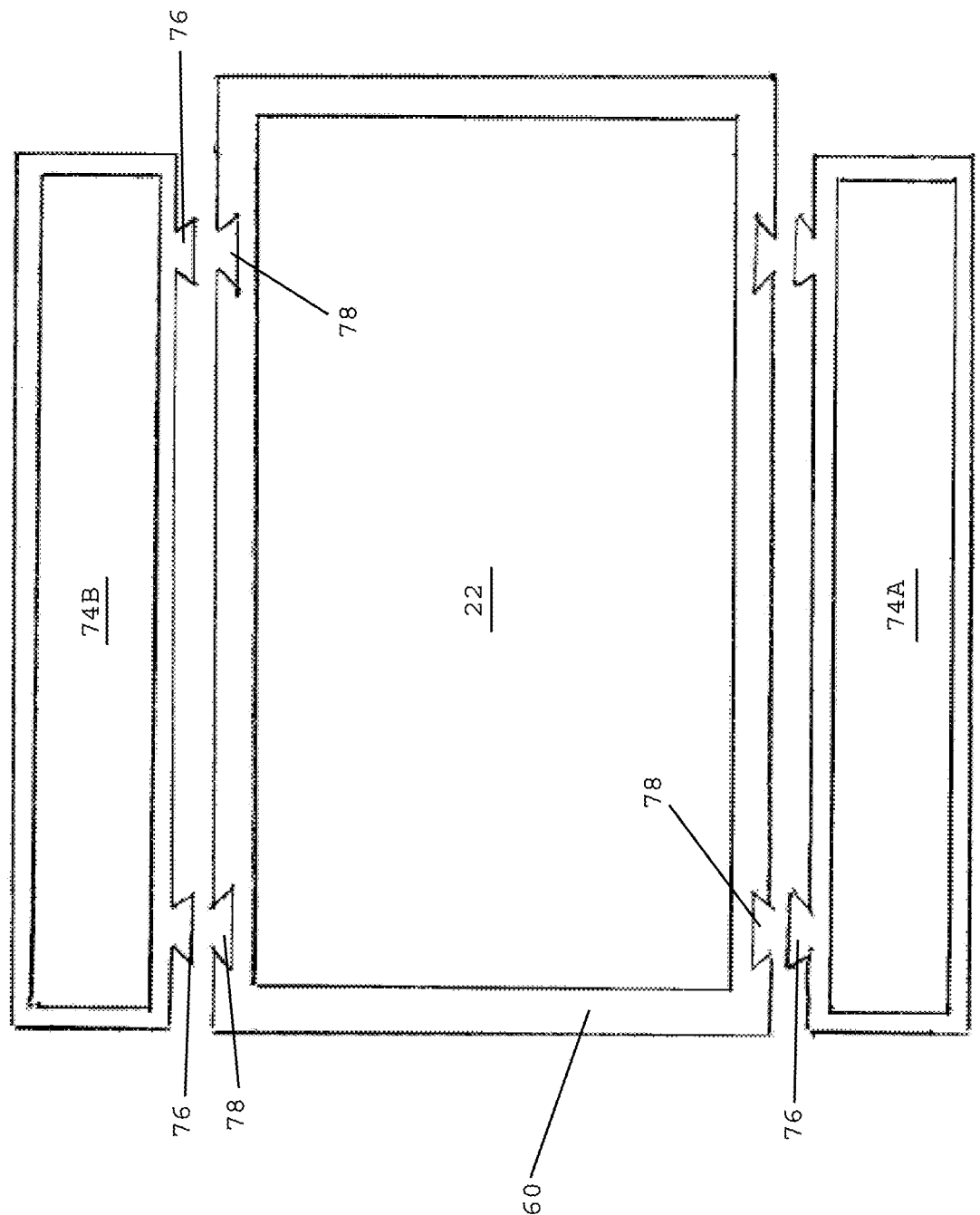
FIG. 9 shows a top plan view of a lower body support of a plumber's creeper and removable tool wings adapted to be secured to the sides of the lower body support.

Referring to FIG. 9, in one embodiment, the first and second tool wings 74A, 74B are removable from their attachment with the lower body support 22. In one embodiment, tongue and groove structure is used for securing the tool wings with the outer frame 60 of the lower body support 22. In FIG. 9, the tool wings 74A, 74B have tongues 76 and the outer surface of the outer frame 60 has grooves 78 that receive the tongues 76. In other embodiments, the grooves may be provided on the tool wings and the tongues may be provided on the outer frame 60.

Figure 10:
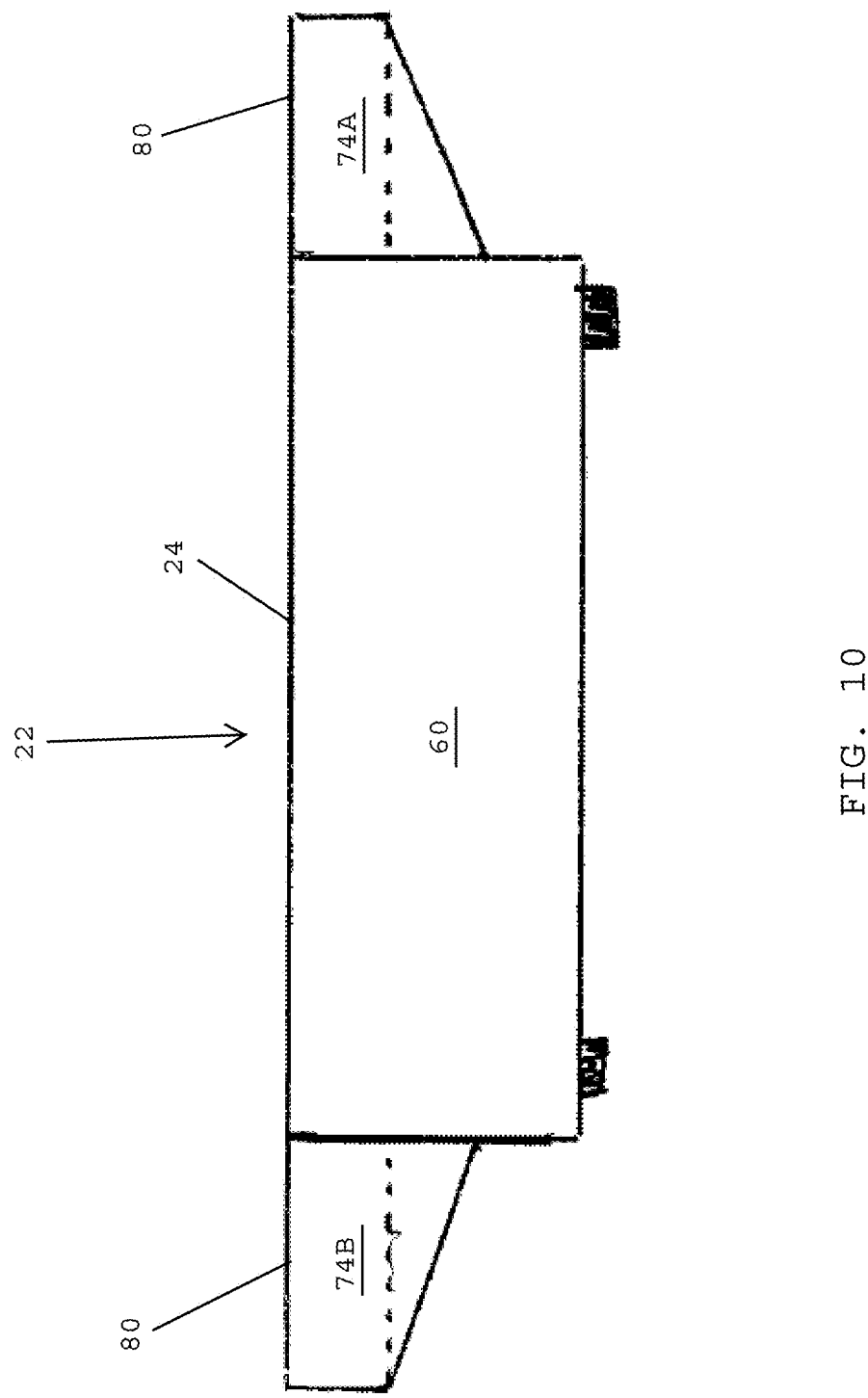
FIG. 10 shows an end view of a plumber's creeper including a lower body support having tool wings secured to the opposite sides of the lower body support.

Referring to FIG. 10, in one embodiment, the first and second tool wings 74A, 74B preferably project laterally from the side walls of the outer frame 60 of the lower body support 22. The tool wings 74A, 74B preferably have recesses formed therein for storing tools on each side of the lower body support 22. In one embodiment, the tool wings 74A, 74B have upper edges 80 that lie in a common plane with the top surface 24 of the lower body support 22.

Figure 11:
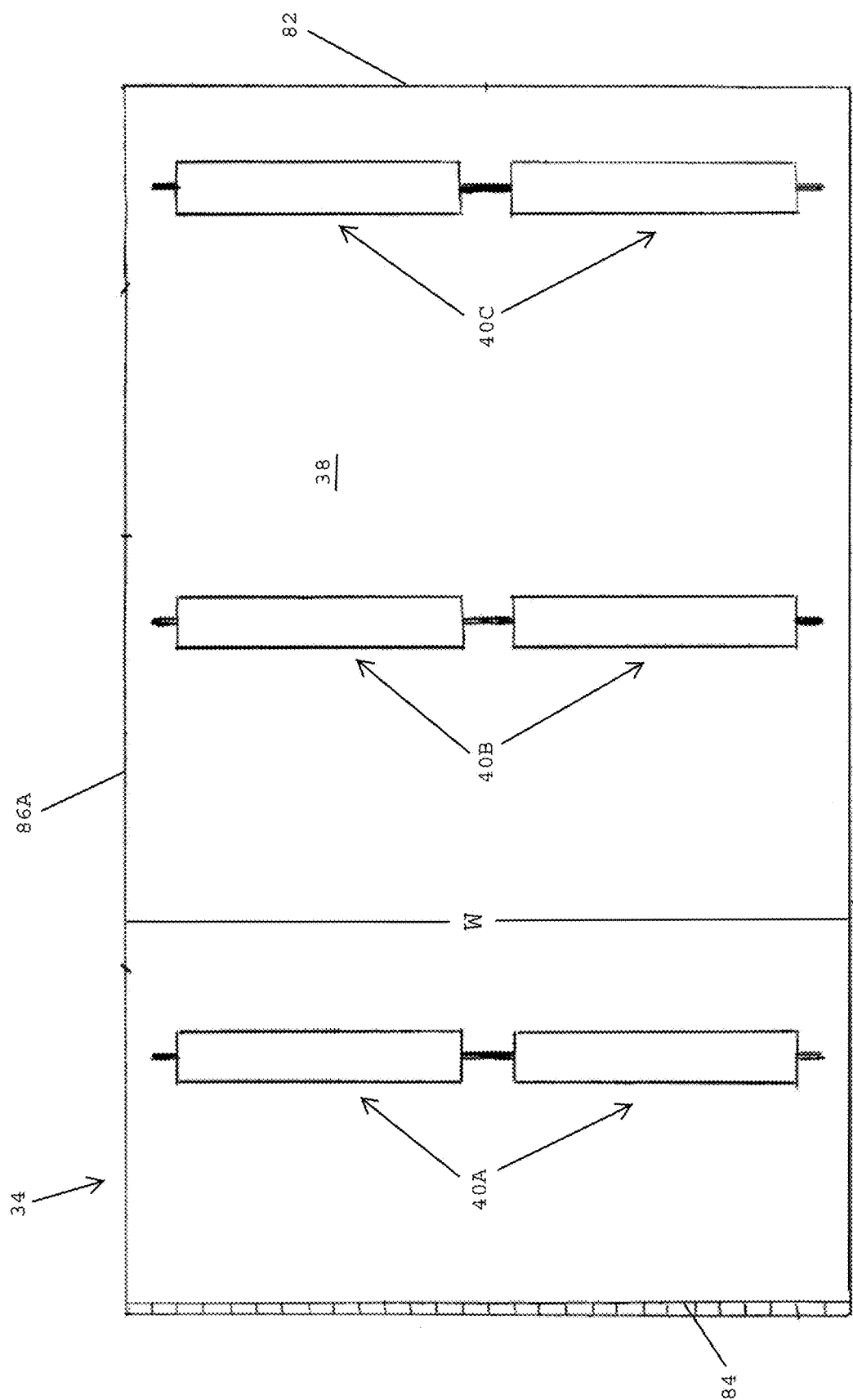
FIG. 11 shows a bottom view of the upper body support of the plumber's creeper shown in FIGS. 1 and 2, in accordance with one embodiment of the present invention.

Referring to FIG. 11, in one embodiment, the upper body support 34 has bottom surface 38 and a series of elongated rollers 40A, 40B, and 40C mounted over the bottom surface 38 for enabling the upper body support to roll over a surface such as a cabinet floor. The upper body support has a distal end 82, a proximal end 84 that is hingedly connected with the lower body support, and first and second lateral sides 86A, 86B that extend between the distal and proximal ends 82, 84. In one embodiment, the elongated rollers in the first series 40A extend the majority of the way across the width W of the upper body support 34. The other series 40B and 40C have similar properties. The elongated rollers 40A, 40B, and 40C are an improvement over the caster wheels found in prior art devices because they extend across the majority of the width W of the upper body support for providing greater support as an operator shifts his or her body weight from side to side on the upper body support. In addition, the weight of the operator is more evenly spread out over the upper body support for minimizing denting, marring or damaging a cabinet floor as the elongated rollers roll over the cabinet floor. The elongated rollers provide a dramatic improvement of the Larson '569 patent, which has a single wheel that supports the entire upper body weight of an individual positioned over a cabinet floor.

In one embodiment, the plumber's creeper may be made using rugged materials including but not limited to metal, wood, rubber, plastic and/or polymers. The wheels and/or or rollers may be made of suitable materials such as rubber, plastic, resin, polyurethane, synthetic, wood or metal, which will provide low friction maneuverability without damaging, marring or other deleterious effect to floors or cabinet floors.

The plumber's creeper disclosed herein is height adjustable so that it may be readily used inside cabinets having different cabinet floor heights. Moreover, the plumber's creeper enables the top supporting surfaces of the upper and lower body support members to lie in a common plane. The upper body support provides lateral support via the elongated rollers, which minimize the likelihood of damage to the cabinet floor.

Figure 12A:
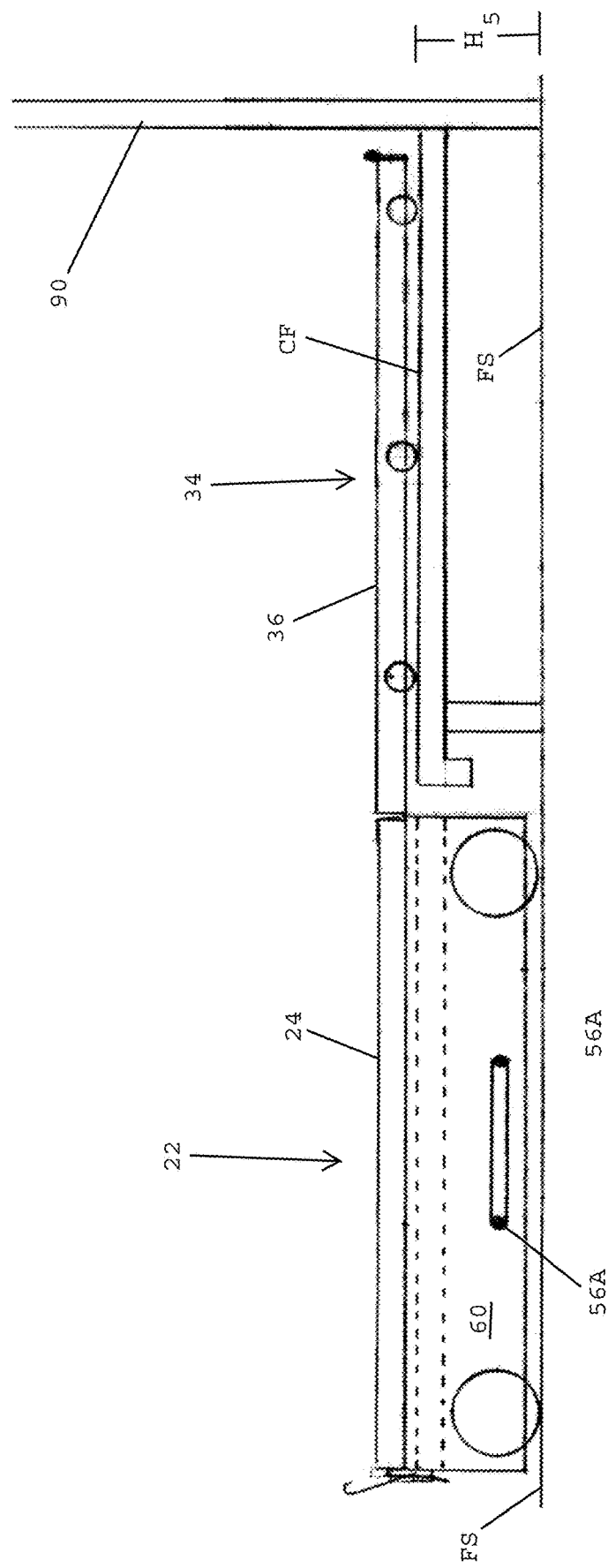
FIG. 12A shows a plumber's creeper overlying a cabinet floor having a first height.

FIG. 12A shows a cabinet 90 having a cabinet floor CF defining a first height $H_5$ relative to a floor surface FS. The upper body support 34 is inserted into the cabinet so that the elongated rollers 40A, 40B, 40C contact the top surface of the cabinet floor CF. The height of the lower body support 22 is then adjusted so that the top surface 24 of the lower body support lies in the same plane as the top surface 36 of the upper body support 34, and so that the respective top surfaces 24, 36 of the upper and lower body supports are parallel with the floor surface FS and the top surface of the cabinet floor CF. In FIG. 12A, the outer frame 60 of the lower body support is positioned at its lowest height, as shown in FIG. 7A.

Figure 12B:
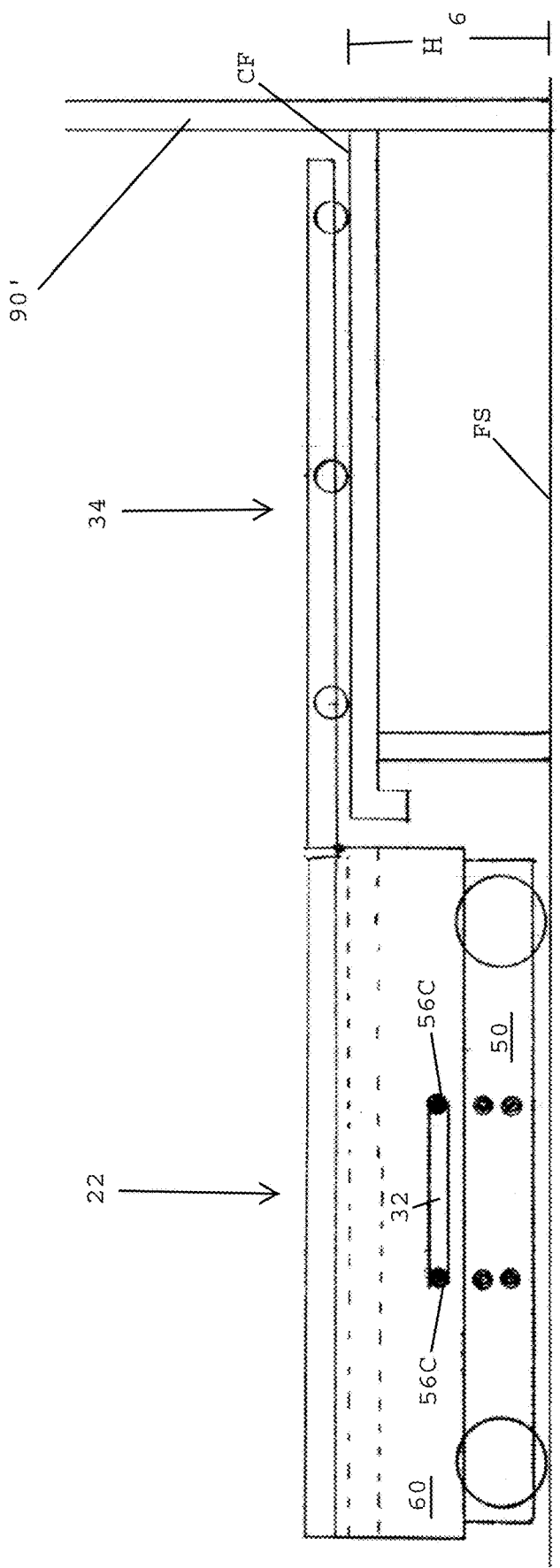
FIG. 12B shows the plumber's creeper of FIG. 12A overlying a cabinet floor having a second height that is greater than the first height of the cabinet shown in FIG. 12A.

FIG. 12B shows a cabinet 90' having a higher cabinet base than the cabinet shown in FIG. 12A. In FIG. 12B, the cabinet 90' has a cabinet floor CF defining a second height $H_6$ relative to a floor surface FS, whereby the second height H6 is greater than the first height $H_5$ shown in FIG. 12A. The upper body support 34 is inserted into the cabinet 90' so that the elongated rollers 40A, 40B, 40C contact the top surface of the cabinet floor CF. The height of the lower body support 22 is then adjusted so that the top surface 24 of the lower body support lies in the same plane as the top surface 36 of the upper body support 34, and so that the respective top surfaces 24, 36 of the upper and lower body supports are parallel with the floor surface FS and the top surface of the cabinet floor CF. In FIG. 12B, the outer frame 60 of the lower body support 22 is positioned at the third height position, as shown in FIG. 7A.

Thus, comparing FIGS. 12A and 12B, it can be observed that the height adjustable plumber's creeper 20 disclosed herein may be readily used in cabinets having cabinet bases with different heights. In FIG. 12A, the creeper is in a lower height position for accommodating a cabinet 90 having a lower cabinet base. In FIG. 12B, the creeper is in a higher height position for accommodating a cabinet 90' having a higher cabinet base. In FIG. 12B, the outer frame 60 is at the third height position relative to the inner frame 50. The height adjustment lever 32 is inserted into the aligned holes to hold the outer frame stable relative to the inner frame 50.

Figure 13:
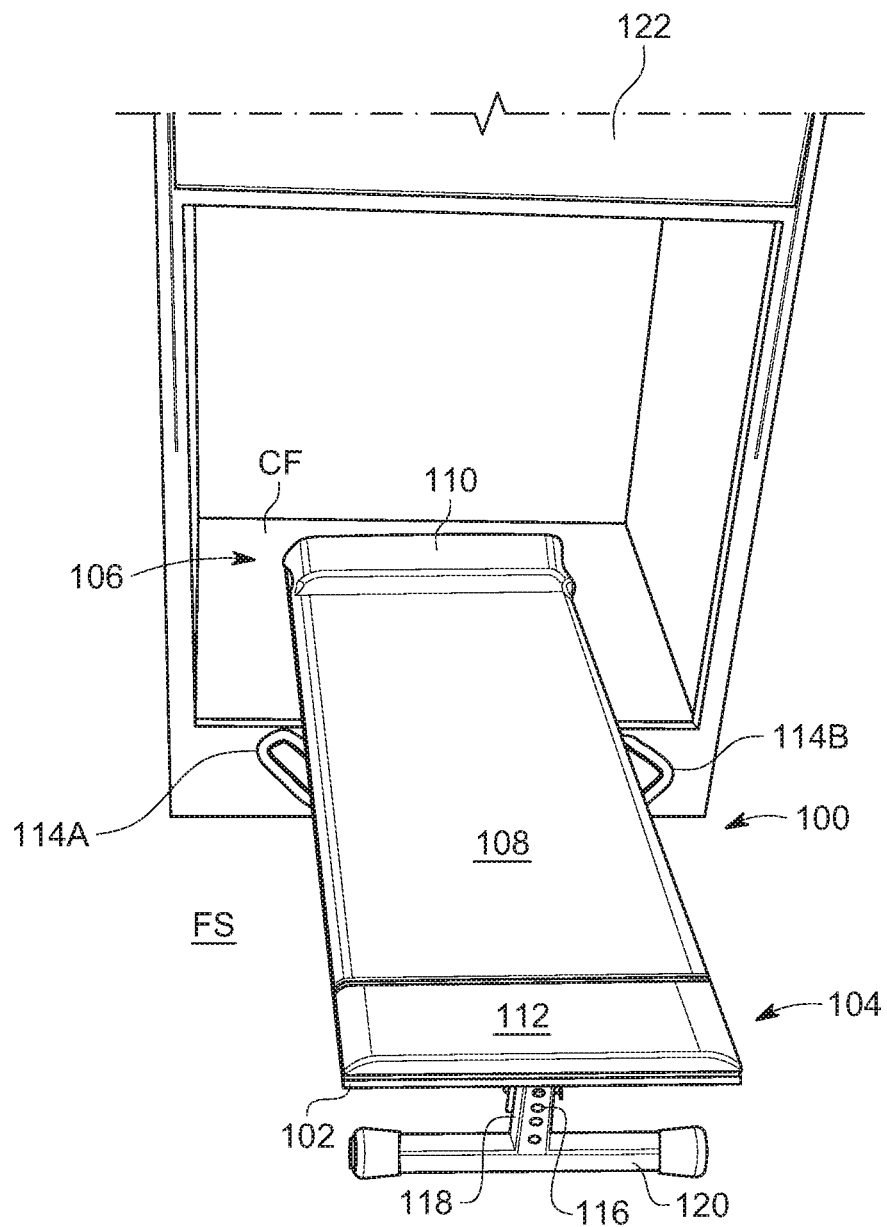
FIGS. 13-16B show a plumber's support, in accordance with one embodiment of the present invention.

Referring to FIG. 13, in one embodiment, a height adjustable plumber's support 100 preferably includes an elongated board 102 having a major top surface and a major bottom surface. The plywood board 102 extends from a first end 104 to a second end 106 of the plumber's support. The top major surface of the plywood board 102 is covered by a cushioned pad 108 that is secured thereto. The height adjustable plumber's support 100 also includes a head pad 110 secured adjacent the distal end 106 of the board 102 and a foot pad 112 secured adjacent the proximal end 104 of the board 102. The head and foot pads may be removable and held in place by hook and loop fastening material.

In one embodiment, the height adjustable plumber's support 100 includes a pair of flexible handles 114A, 114B that are secured to opposite lateral sides of the board 102. The handles may be made of rugged materials such as fabric, cloth and vinyl. In one embodiment, a first flexible handle 114 is secured to a first lateral side of the board 102 and a second flexible handle 114B is secured to a second lateral side of the board 102.

In one embodiment, the height adjustable plumber's support 100 includes a foldable support leg 116 having a vertical section 118 and a horizontally extending section 120. As will be described in more detail herein, the foldable support leg 116 is height adjustable for adjusting the height of the proximal end 104 of the board 102 over a floor surface FS. When not in use, the foldable support leg 116 may be folded over the bottom major surface of the board 102 for storage and transport purposes.

In one embodiment, the height adjustable plumber's support 100 may be utilized in conjunction with a cabinet 122 having a cabinet floor CF that is elevated relative to the floor surface FS. As shown in FIG. 13, the proximal end 104 of the board 102 is held above the floor surface FS by the foldable support leg 116. The distal end 106 of the board 102 is positioned atop the elevated cabinet floor CF. The height of the vertical section 118 of the leg may be adjusted so that the top major surface of the board 102 is parallel relative to the floor surface FS. When the distal end 106 of the board 102 is inserted into a cabinet having a cabinet floor of a different height than the cabinet shown in FIG. 13, the height of the vertical section 118 of the leg 116 may be adjusted to accommodate the different height of the cabinet floor.

Figure 14:
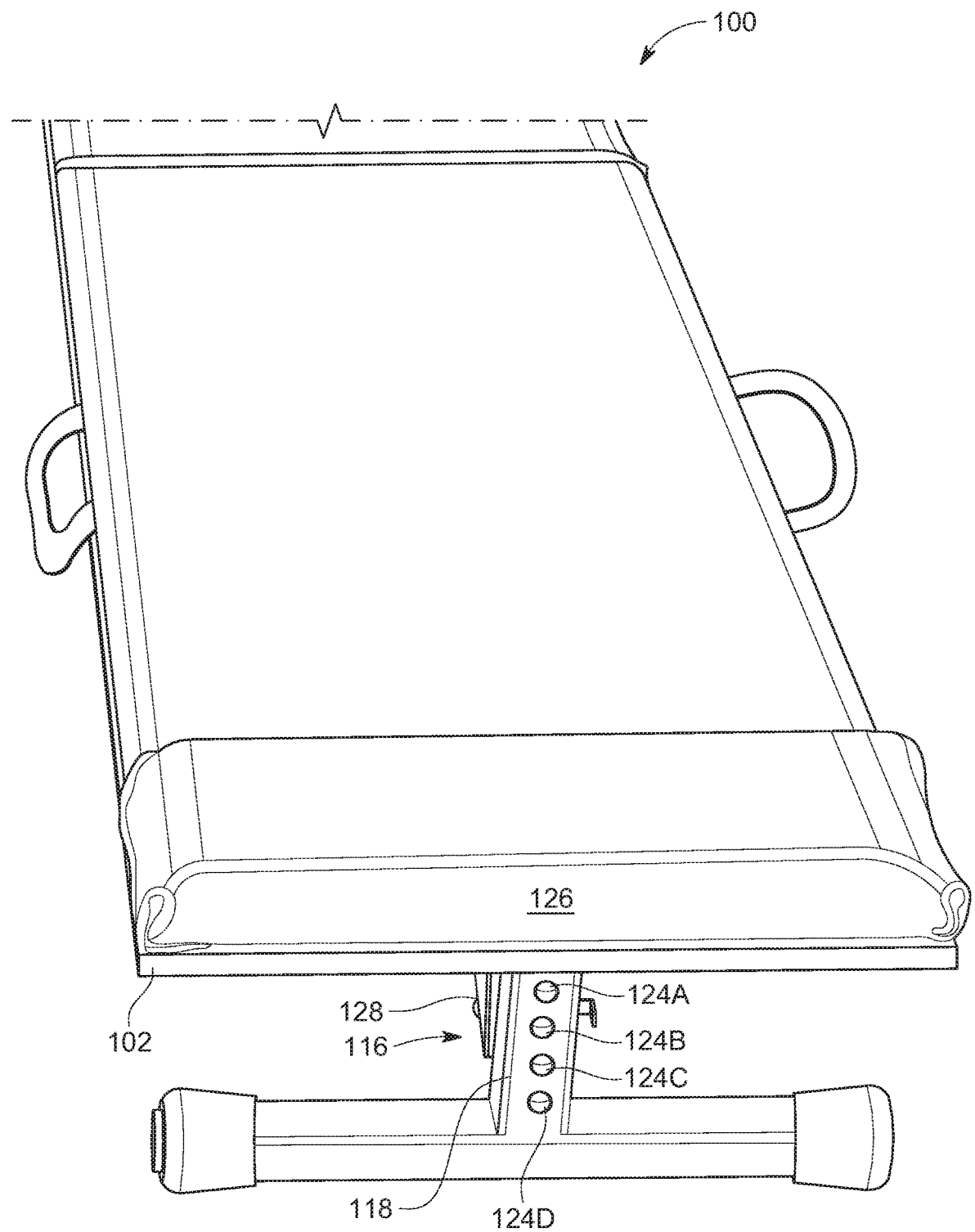

FIG. 14 shows a magnified view of the height adjustable plumber's support 100 shown in FIG. 13. The foldable leg 116 includes the vertical section 118 having a series of vertically aligned openings 124A-124D. A vertical height adjustment includes depressible snap buttons 126 that may be depressed for adjusting the length of the vertical section 118 of the leg 116 relative to the plywood board 102. The height adjustable plumber's support 100 also includes a foldable bracket 128 that secures the foldable support leg 116 to the underside of the plywood board 102. The foldable support leg 116 is movable between a vertical, extended position shown in FIG. 14 and a folded, horizontal configuration (FIG. 15B) in which the vertical section 118 of the leg 116 extends parallel to the bottom major surface of the plywood board 102.

Figure 15A:
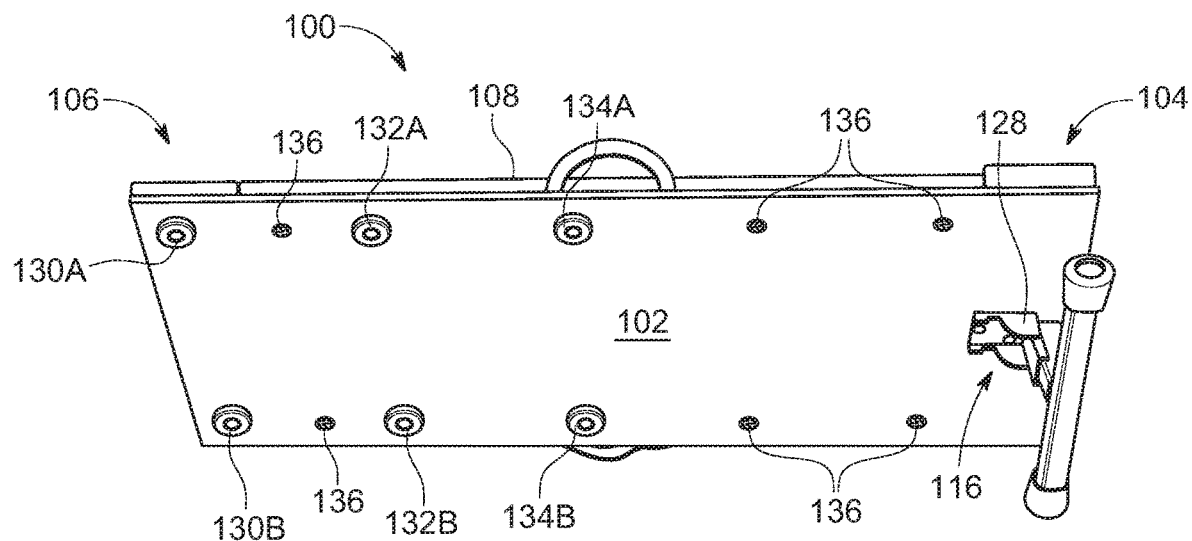
Figure 15B:
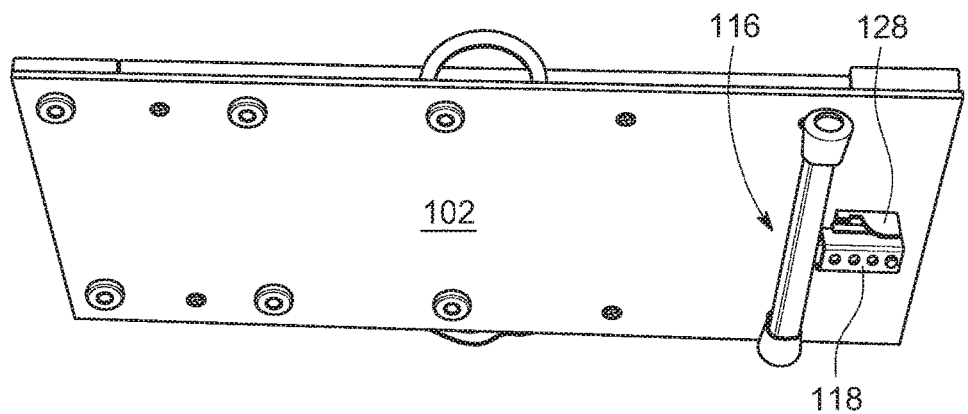

FIG. 15A shows the foldable leg 116 in an extended, vertical configuration for supporting the proximal end 104 of the plywood board 102. FIG. 15B shows the foldable leg 116 in a folded, collapsed configuration whereby the vertical section 118 of the leg 116 extends along an axis that is parallel to the bottom major surface of the plywood board 102.

During transport and storage, the foldable leg 116 is typically placed in the folded configuration shown in FIG. 15B. Referring to FIG. 15A, during use, the foldable leg 116 is extended into the vertical orientation shown in FIG. 15B.

Referring to FIGS. 15A and 15B, in one embodiment, spaced rubber pads are secured to the bottom major surface of the plywood board 102. In one embodiment, the spaced rubber pads are secured over the upper body support section adjacent the distal end 106 of the plywood board 102. In one embodiment, a first pair of rubber pads 130A, 130B are secured adjacent the distal end 106 of the plywood board 102. In one embodiment, a second pair of rubber pads 132A, 132B are secured between the first set of rubber pads and the mid-section of the plywood board 102. In one embodiment, a third set of rubber pads 134A, 134B are secured to a mid-section of the plywood board 102. The rubber pads are desirably secured over a bottom major surface of the plywood board 102, are spaced away from one another to distribute weight evenly. The rubber pads are designed to prevent the underside of the plumber's support 100 from scratching the inside of a cabinet when the board 102 is placed over a cabinet floor. The rubber pads also provide lateral support as a user rolls from side to side atop the board when working inside a cabinet.

In one embodiment, T-nuts are utilized for securing the rubber pads over the bottom major surface of the plywood board 102. In one embodiment, the upper ends of the T-nuts are disposed over the top major surface of the board and the vertical components of the T-nuts extend through the thickness of the board 102. The rubber pads are secured over the bottom major surface of the board 102 by aligning the rubber pads with the threaded ends of the T-nuts and utilizing threaded fasteners for securing the rubber pads to the plywood board 102.

In one embodiment, the plumber's support 100 includes the padded cushion 108 that overlies the top major surface of the plywood board 102. Threaded fasteners 136 are used for securing the padded cushion to the plywood board 102.

Referring to FIGS. 15A and 15B, in one embodiment, the folding bracket 128 of the foldable leg 116 is secured over the bottom major surface of the plywood board 102. The folding bracket 128 enables the folding leg 116 to move from the extended, vertical orientation shown in FIG. 15A to the folding, collapsed configuration shown in FIG. 15B. The folding bracket 128 may include a lock for maintaining the foldable leg 116 in the extended position shown in FIG. 15A and preventing the foldable leg from collapsing to the collapsed configuration shown in FIG. 15B.

Figure 16A:
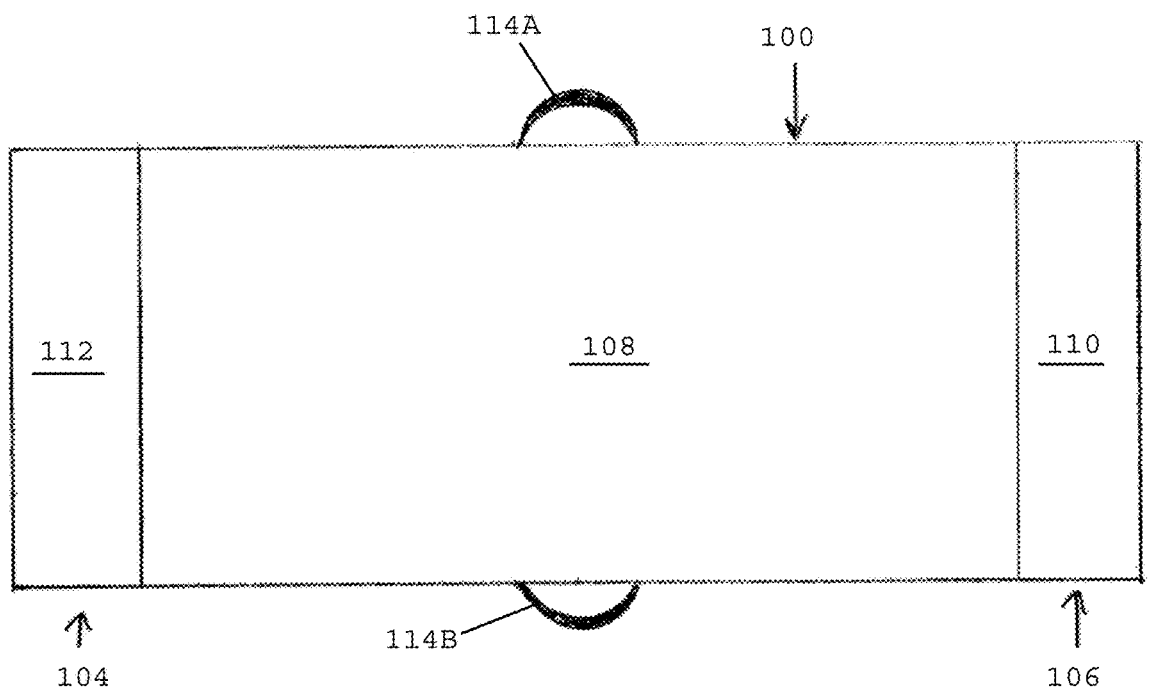
Figure 16B:
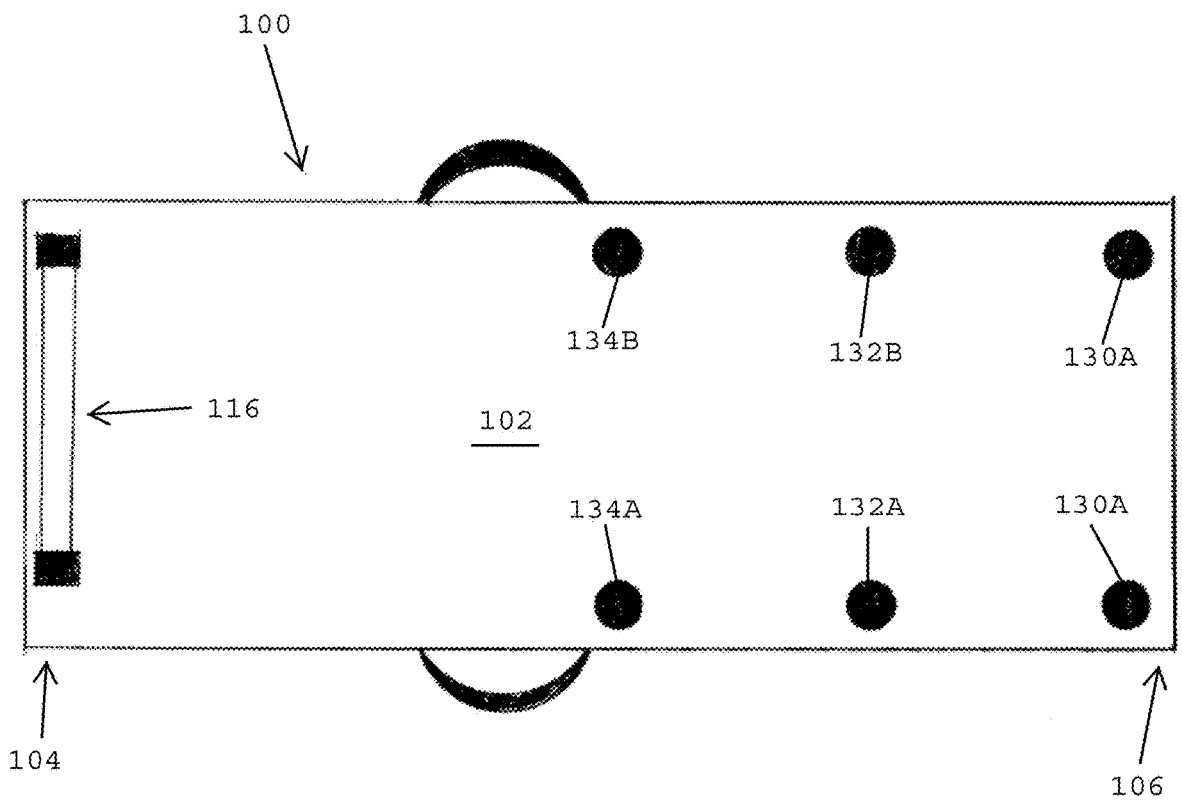

Referring to FIGS. 16A and 16B, in one embodiment, a height adjustable plumber's support 100 includes a plywood board 102 (FIG. 13) having a proximal end 104 and a distal end 106. A cushioning pad 108 overlies the top major surface of the board 102. The plumber's support 100 includes a removable foot pad 112 that covers the proximal end 104 of the board and a removable head pad 110 that covers the distal end 106 of the board. In one embodiment, the head pad 110 and foot pad 112 are secured to the top major surface of the plywood board 102 (FIG. 13) using releasable fastening materials such as hook and loop fastening material sold under the trademark Velcro. In one embodiment, the head pad 110 may be removed from its attachment with the distal end 106 of the board and reattached to the proximal end 104 of the board. Similarly, the foot pad 112 may be moved from the proximal end 104 of the board to an attachment with the distal end 106 of the board.

In one embodiment, the flexible handles 114A, 114B are secured to the long sides of the board for carrying the plumber's support, when necessary.

FIG. 16B shows the underside of the plumber's support 100 including the plywood board 102 having rubber pads 130A, 130B, 132A, 132B, 134A, and 134B secured thereto. The foldable leg 116 is secured to the proximal end 104 of the plywood board 102.

Figure 17A:
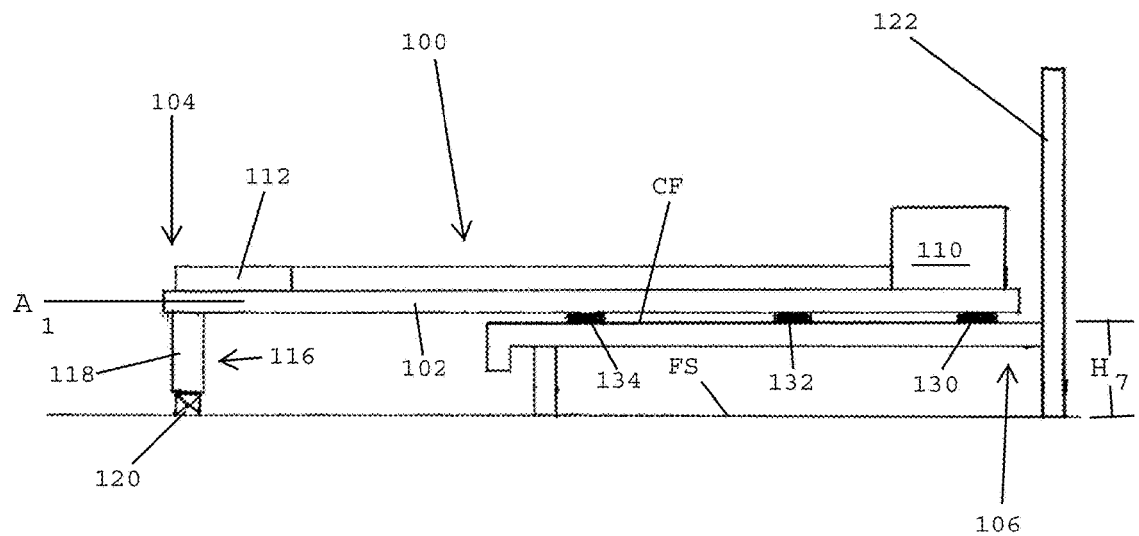
FIGS. 17A and 17B show a method of using the plumber's support shown in FIGS. 13-16B.

FIG. 17A shows a cabinet 122 having a cabinet floor CF defining a height $H_7$ relative to a floor surface FS. The distal end 106 of the board 102 is inserted into the cabinet 122 so that the rubber pads 130, 132, and 134 contact the top surface of the cabinet floor CF. The height of the vertical leg support 118 of the foldable leg 116 is then adjusted so that the top major surface of the board 102 extends along an axis $A_1$ that is parallel with the floor surface FS, and so that the rubber pads are in support with the top surface of the cabinet floor CF. In FIG. 17A, the proximal end 104 of the board 102 and the foldable leg 116 are located outside the cabinet 122. The horizontal component 120 of the foldable leg 116 sits atop of the floor surface FS.

Figure 17B:
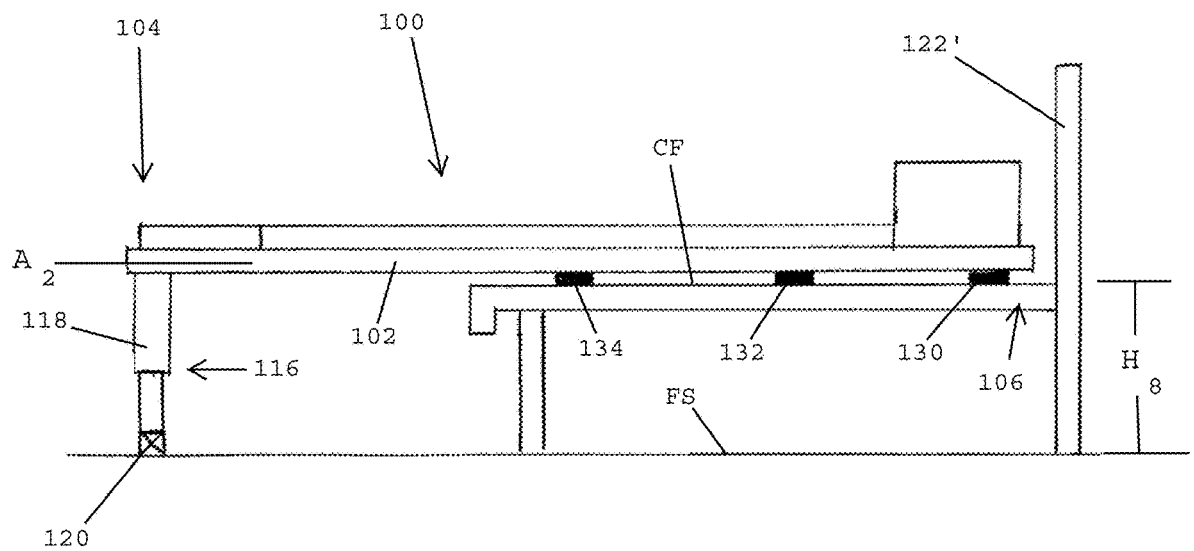

FIG. 17B shows a cabinet 122' having a higher cabinet base than the cabinet shown in FIG. 17A. In FIG. 17B, the cabinet 122' has a cabinet floor CF defining a height $H_8$ relative to a floor surface FS, whereby the height $H_8$ is greater than the height $H_7$ shown in FIG. 17A. The distal end 106 of the board 102 is inserted into the cabinet 122' so that the rubber pads 130, 132, 134 secured to the bottom major surface of the board 102 contact the top surface of the cabinet floor CF. The height of the vertical support 118 of the foldable leg 116 is adjusted so that the top major surface of the body 102 extends along an axis $A_2$ that is parallel with the floor surface FS. In one embodiment, the depressible button 126 shown in FIG. 14 is depressed for adjusting the height of the vertical section 118 of the leg so that the board 102 is parallel to the floor surface FS.

In FIG. 17B, the proximal end 104 of the board 102 and the foldable leg 116 lie outside of the cabinet 122'. The vertical section 118 and the horizontal section 120 of the foldable leg 116 is supported by the floor surface SF.

Referring to FIGS. 17A and 17B, in one embodiment, the plumber's support 100 includes a head pad 110 secured over the distal end 106 of the board 102 and a foot pad 112 secured over the proximal end 104 of the board 102. In one embodiment, the head pad 110 has a greater thickness than the foot pad 112.

Figure 18A:
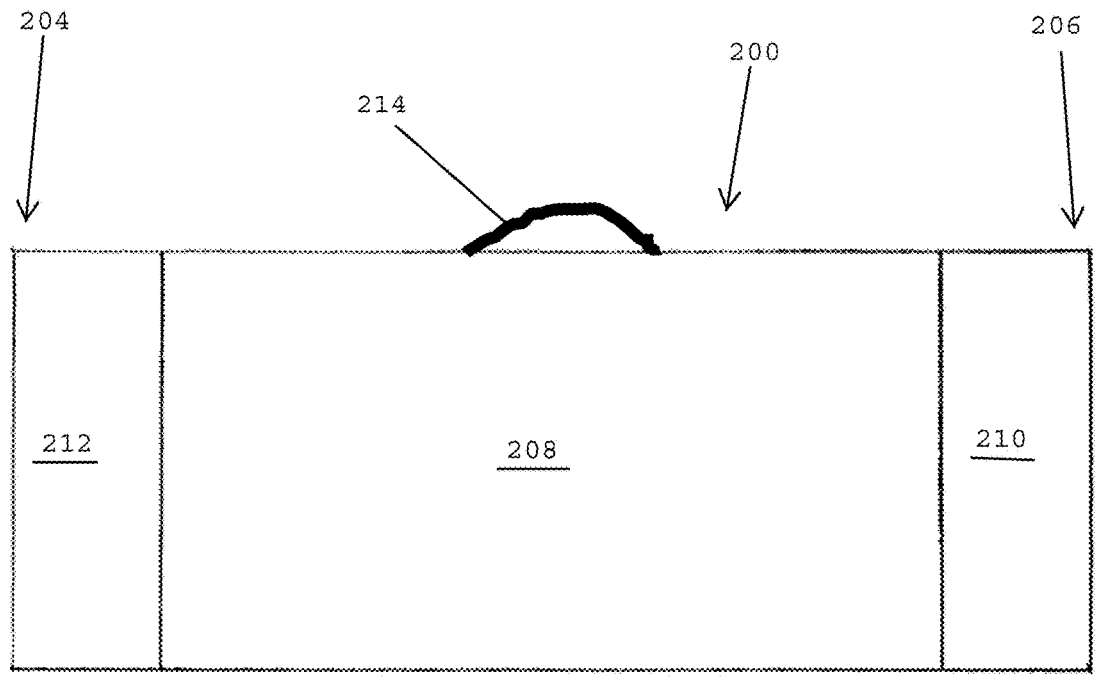
FIGS. 18A and 18B show a plumber's support, in accordance with one embodiment of the present invention.
Figure 18B:
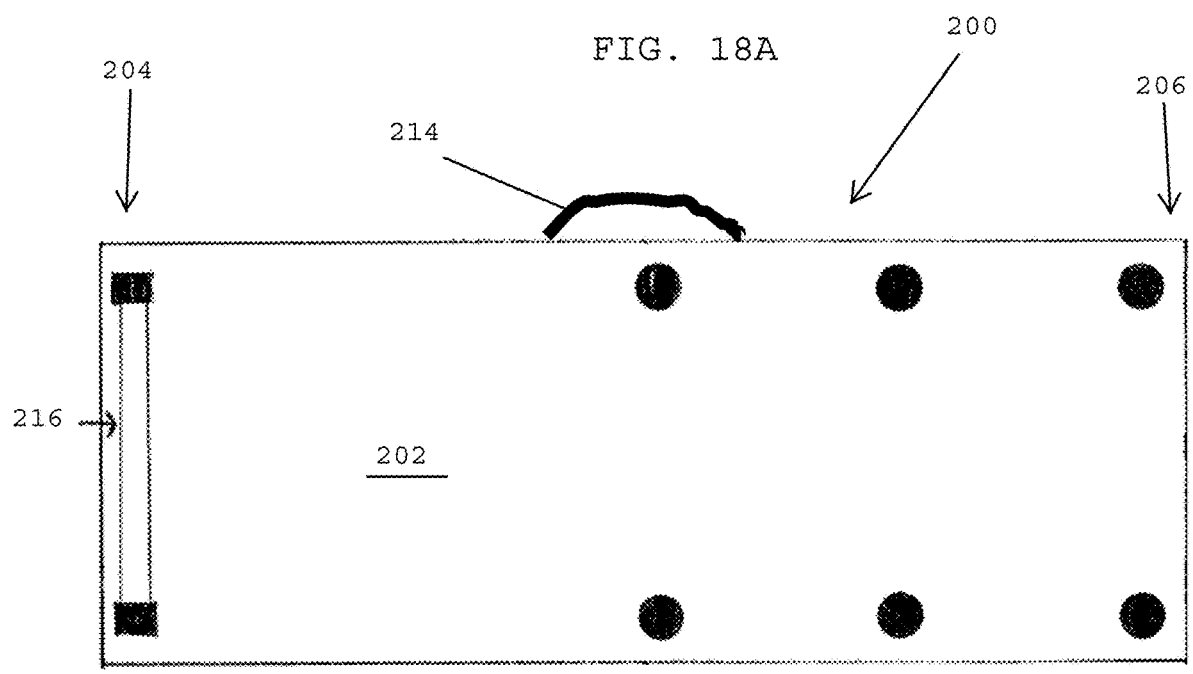

Referring to FIGS. 18A and 18B, in one embodiment, a height adjustable plumber's support 200 includes an elongated board 202 having a top major surface and a bottom major surface. A cushioning pad 208 is secured over the top major surface of the plywood board 202. A head pad 210 is secured over the top major surface of the board 202 at the distal end 206 of the board 202 and a foot pad 212 is secured over the top major surface of the board 202 and the proximal end 204 of the board 202. A flexible handle 214 is secured to one side of the board 202 for carrying the plumber's support 200. In one embodiment, the head pad 210 and the foot pad 212 have a similar thickness.

Referring to FIG. 18B, in one embodiment, the plumber's support 200 includes rubber pads 230A, 230B, 232A, 232B, 234A, and 234B that are spaced from one another and secured to the bottom major surface of the board 202. The plumber's support 200 includes a foldable leg 216 that is secured to the proximal end 204 of the board. In one embodiment, the rubber pads 230A, 230B, 232A, 232B, 234A, and 234B extend from the distal end 206 of the board 202 toward a mid-section of the board 202. The rubber pads prevent the underside of the board from scratching or marring the cabinet floor and provide lateral support as a user rolls from side to side inside a cabinet.

Figure 19:
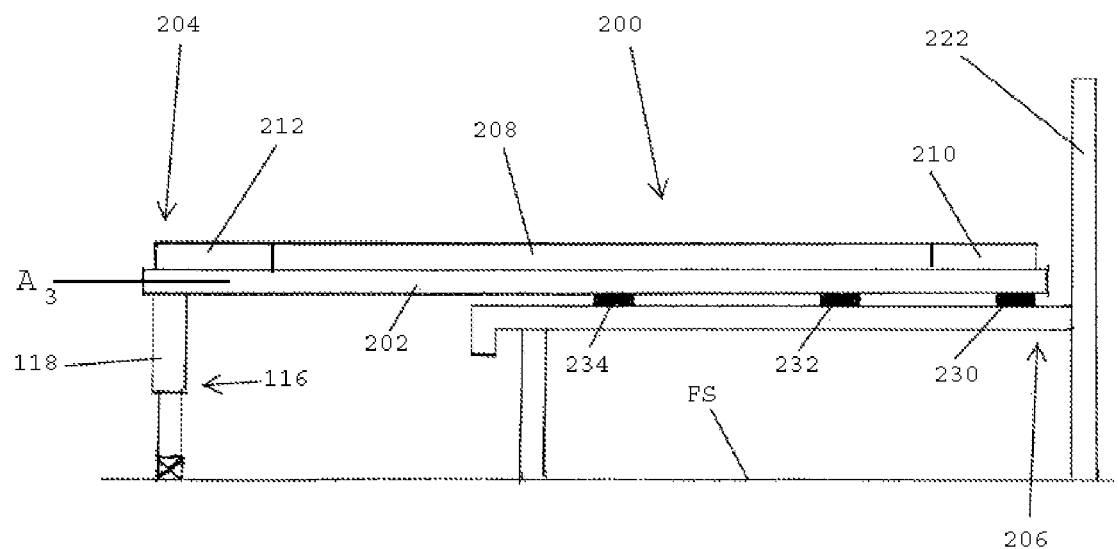
FIG. 19 shows a method of using a plumber's support, in accordance with one embodiment of the present invention.

Referring to FIG. 19, in one embodiment, the plumber's support 200 may be utilized to support an individual inside a cabinet 222 having a cabinet floor CF that is elevated relative to a floor surface FS. In one embodiment, the distal end 206 of the board 202 is inserted into the cabinet 222 so that the rubber pads 230, 232 and 234 overlie the top surface of the cabinet floor CF. The foldable leg 116 is located outside the cabinet 222 for supporting the proximal end 204 of the board 202 over the floor surface FS. The vertical section 118 of the leg 116 is adjusted to a length so that the board 202 extends along an axis $A_3$ that is parallel with the floor surface FS. The cushion padding 208, the head pad 210 and the foot pad 212 provide cushioning support for a user lying over the top of the plumber's support 200.

Figure 20A:
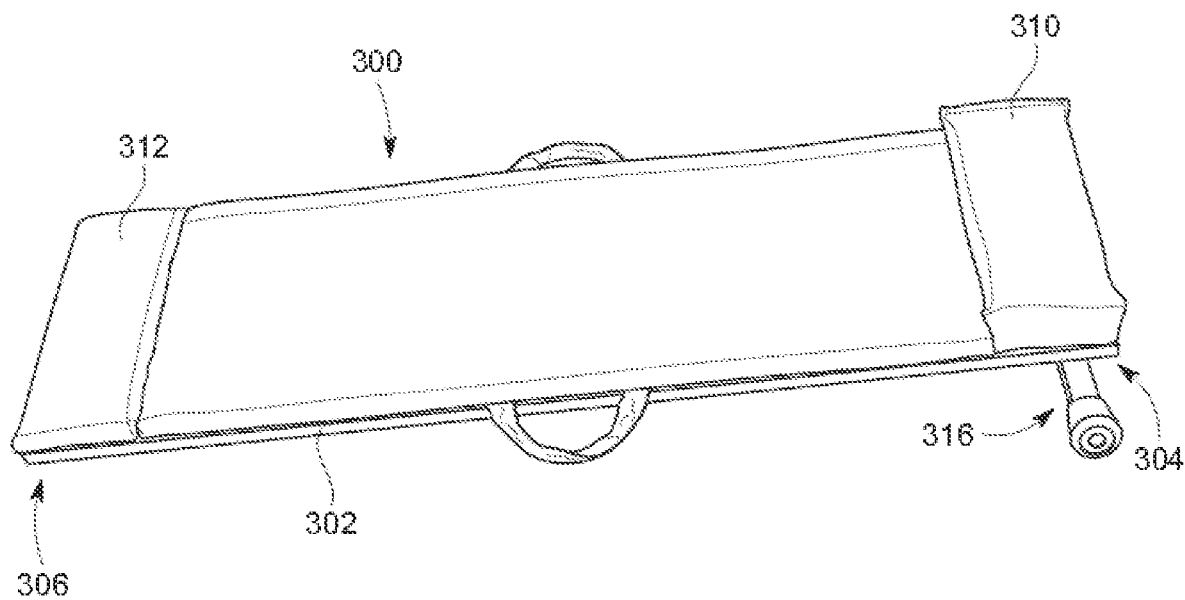
FIGS. 20A and 20B show a method of using a plumber's support, in accordance with another embodiment of the present invention.
Figure 20B:
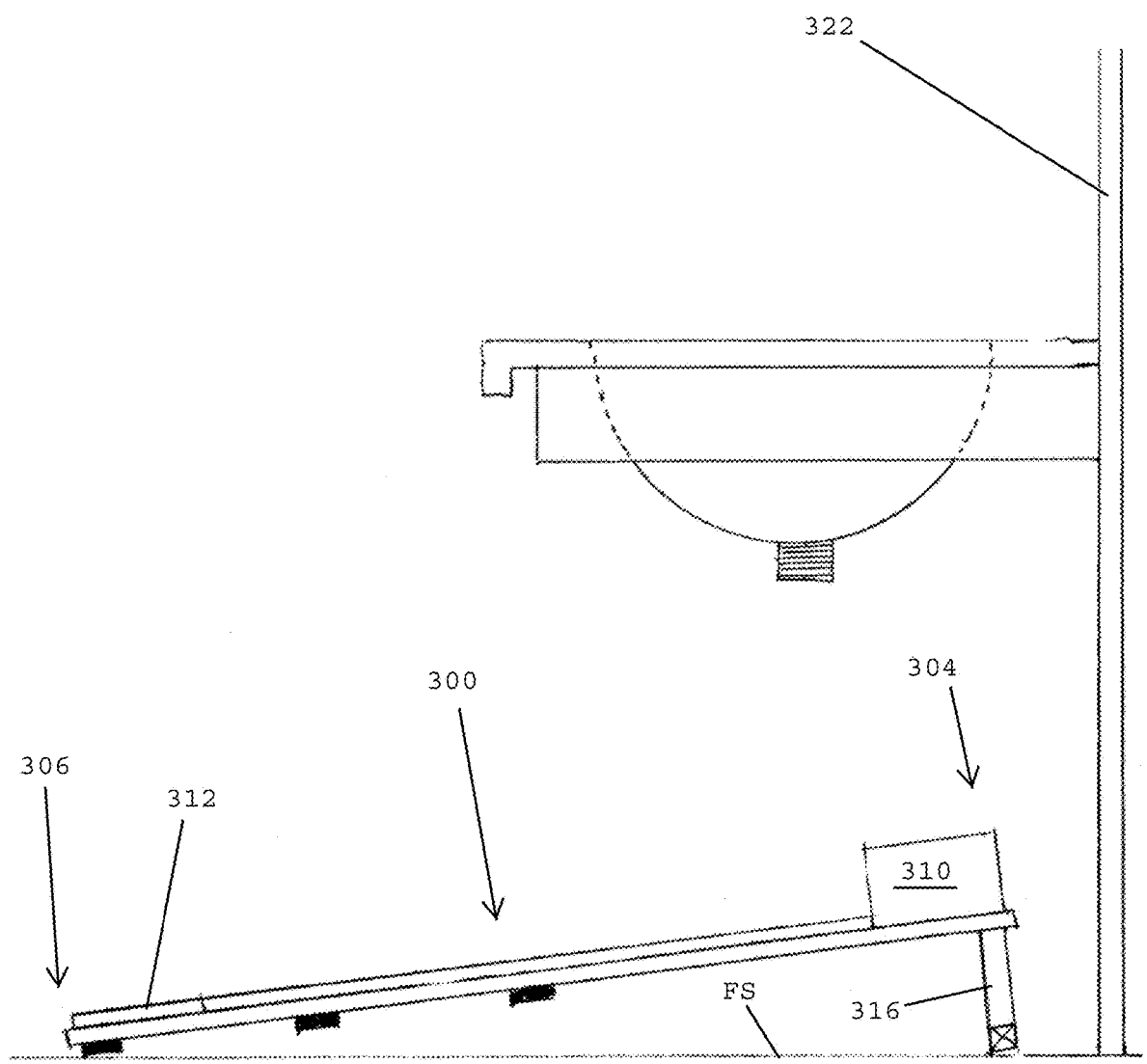

In certain instances, a cabinet may not have a cabinet floor that is higher than a floor surface. In these instances, the position of the head pad 310 and the foot pad 312 may be swapped. In FIGS. 20A and 20B, the head pad 310, which is thicker than the foot pad 312, has been detached from the distal end 306 of the board 302 and reattached at the proximal end 304 of the board 302. As a result, the head pad 310 is positioned over the foldable leg 316 located at the proximal end 304 of the board 302.

Referring to FIG. 20B, the cabinet 322 does not have a cabinet floor that lies above the floor surface FS. As a result, the lower end of the foldable leg 316 is positioned directly atop the floor surface FS. The thicker head pad 310 is secured over the top major surface of the board 102 at the proximal end 304 of the board 302. The foot pad 312 is secured over the top major surface of the board 302 at the distal end 306 of the board 302.

Although the present invention is not limited by any particular theory of operation, it is believed that providing a plumber's support 300 having interchangeable head support pads 310 and foot support pads 312 provides a support having more versatility.

The dimensions disclosed herein are merely examples of one embodiment of the present invention. In other embodiments, the creeper disclosed herein may be modified so that it may be used on larger pieces of equipment such as commercial refrigerators, cold tables, salad bars, etc. The creeper may be utilized anywhere it is necessary to lie on one's back while maintaining and/or repairing equipment and systems. Thus, the size and configuration of the creeper may be modified so that it may be sued in different industries.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A height adjustable plumber's support comprising:
    an elongated board having top and bottom major surfaces that extend from a proximal end to a distal end of said elongated board;
    a cushioned pad covering a central region of said top major surface;
    a head pad covering said top major surface adjacent said distal end of said elongated board;
    a foot pad covering said top major surface adjacent said proximal end of said elongated board;
    a pair of flexible handles secured to opposite lateral sides of said elongated board;
    a foldable support leg secured to said proximal end of said elongated board, said foldable support leg having a vertical section and a horizontally extending section, wherein said foldable support leg is height adjustable for adjusting the height of said proximal end of said elongated board over a floor surface; and
    a plurality of spaced pads secured to said bottom major surface of said elongated board adjacent said distal end of said elongated board;
    wherein said head and foot pads are removable and held in place by hook and loop fastening material, and wherein the positions of said head and foot pads are adapted to be swapped into a configuration in which said head pad is releasably secured to said top major surface of said elongated board adjacent said proximal end of said elongated board and said foot pad is releasably secured to said top major surface of said elongated board adjacent said distal end of said elongated board.

2. The height adjustable plumber's support as claimed in claim 1, wherein said foldable support leg is foldable over said bottom major surface of said elongated board for storage and transportation.

3. The height adjustable plumber's support as claimed in claim 2, wherein said foldable leg comprises a series of vertically aligned openings and depressible snap buttons that may be depressed for adjusting the length of a vertical section of said leg relative to said elongated board.

4. The height adjustable plumber's support as claimed in claim 3, further comprising a foldable bracket that secures said foldable support leg to an underside of said elongated board, wherein said foldable support leg is movable between a vertical, extended position and a folded, horizontal configuration in which said vertical section of said leg extends parallel to said bottom major surface of said elongated board.

5. The height adjustable plumber's support as claimed in claim 1, wherein said head pad is thicker than said foot pad.

6. The height adjustable plumber's support as claimed in claim 5, wherein said cushioned pad covering the central region of said top major surface is secured to said elongated board by fasteners.

7. The height adjustable plumber's support as claimed in claim 6, wherein said fasteners are threaded fasteners.

8. The height adjustable plumber's support as claimed in claim 1, wherein said elongated board has an upper body support section adjacent said distal end of said elongated board, and wherein said plurality of spaced pads are secured over the upper body support section of said elongated board.

9. The height adjustable plumber's helper as claimed in claim 1, wherein said plurality of spaced pads comprise rubber.

10. The height adjustable plumber's helper as claimed in claim 1, wherein said plurality of spaced pads comprise:
    a first pair of rubber pads that are secured adjacent said distal end of said elongated board;
    a second pair of rubber pads that are secured between said first pair of rubber pads and a mid-section of said elongated board; and
    a third pair of rubber pads that are secured to the mid-section of said elongated board.

11. The height adjustable plumbers helper as claimed in claim 1, wherein said elongated board has a mid-section located between said proximal and distal ends of said elongated board, and wherein said pair of flexible handles are secured to the opposite lateral sides of said elongated board at the mid-section of said elongated board.

12. A height adjustable plumbers support comprising:
    an elongated board having top and bottom major surfaces that extend from a proximal end to a distal end of said elongated board;
    a cushioned pad covering a central region of said top major surface of said elongated board and secured to said elongated board using fasteners;
    a head pad covering said top major surface adjacent said distal end of said elongated board, wherein said head pad is releasably secured to said elongated board using hook and loop fastening material;
    a foot pad covering said top major surface adjacent said proximal end of said elongated board, wherein said foot pad is releasably secured to said elongated board using hook and loop fastening material;
    a pair of flexible handles secured to opposite lateral sides of said elongated board at a mid-section of said elongated board;
    a foldable support leg secured to said proximal end of said elongated board, said foldable support leg having a vertical section and a horizontally extending section, wherein said foldable support leg is height adjustable for adjusting the height of said proximal end of said elongated board over a floor surface; and
    a plurality of rubber pads secured to said bottom major surface of said elongated board adjacent said distal end of said elongated board, wherein said plurality of rubber pads are spaced from one another over an upper body support section adjacent said distal end of said elongated board;

wherein said plurality of rubber pads comprise a first pair of rubber pads that are secured adjacent said distal end of said elongated board, a second pair of rubber pads that are secured between said first pair of rubber pads and a mid-section of said elongated board, and a third pair of rubber pads that are secured to the mid-section of said elongated board.

13. The height adjustable plumber's support as claimed in claim 12, wherein said foldable support leg is foldable over said bottom major surface of said elongated board for storage and transportation.

14. The height adjustable plumber's support as claimed in claim 13, wherein said foldable support leg comprises a series of vertically aligned openings and depressible snap buttons that may be depressed for adjusting the length of a vertical section of said leg relative to said elongated board.

15. The height adjustable plumber's support as claimed in claim 14, further comprising a foldable bracket that secures said foldable support leg to an underside of said elongated board, wherein said foldable support leg is movable between a vertical, extended position and a folded, horizontal configuration in which said vertical section of said foldable support leg extends parallel to said bottom major surface of said elongated board.

16. The height adjustable plumbers support as claimed in claim 12, wherein the positions of said head and foot pads are adapted to be swapped from a first configuration in which said foot pad is releasably secured to said proximal end of said elongated board and said head pad is releasably secured to said distal end of said elongated board into a second configuration in which said head pad is releasably secured to said proximal end of said elongated board and said foot pad is releasably secured to said distal end of said elongated board.

17. A height adjustable plumber's support comprising:
   an elongated board having a proximal end and a distal end, and top and bottom major surfaces that extend from said proximal end to said distal end of said elongated board;
   a cushioned pad covering a central region of said top major surface of said elongated board, wherein said cushioned pad is secured to said elongated board using fasteners;
   a head pad covering said top major surface of said elongated board adjacent said distal end of said elongated board, wherein said head pad is releasably secured to said elongated board;
   a foot pad covering said top major surface of said elongated board adjacent said proximal end of said elongated board, wherein said foot pad is releasably secured to said elongated board;
   at least one flexible handle secured to a lateral side of said elongated board;
   a foldable support leg secured to said proximal end of said elongated board, said foldable support leg having a vertical section and a horizontally extending section, wherein said foldable support leg is height adjustable for adjusting the height of said proximal end of said elongated board over a floor surface; and
   a plurality of pads secured to said bottom major surface of said elongated board, wherein said plurality of pads are spaced from one another over an upper body support section of said elongated board that is adjacent said distal end of said elongated board;
   said height adjustable plumber's support having a first configuration in which said elongated board is parallel to a floor surface with said head pad releasably secured over said distal end of said elongated board and said foot pad releasably secured over said proximal end of said elongated board, and a second configuration in which said elongated board is nonparallel to a floor surface with said foot pad releasably secured over said distal end of said elongated board and said head pad releasably secured over said proximal end of said elongated board.

18. The height adjustable plumber's helper as claimed in claim 17, wherein said plurality of pads comprise rubber, and wherein said at least one flexible handle in located at a mid-section of said elongated board that is located between said proximal and distal ends of said elongated board.

* * * * *